US012341738B2

(12) United States Patent
Heikkinen et al.

(10) Patent No.: US 12,341,738 B2
(45) Date of Patent: Jun. 24, 2025

(54) CONTEXTUAL REPLY AUGMENTATION SYSTEM

(71) Applicant: Snap Inc., Santa Monica, CA (US)

(72) Inventors: Christie Marie Heikkinen, Sherman Oaks, CA (US); David Phillip Taitz, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/205,319

(22) Filed: Jun. 2, 2023

(65) Prior Publication Data

US 2023/0396572 A1     Dec. 7, 2023

Related U.S. Application Data

(60) Provisional application No. 63/348,305, filed on Jun. 2, 2022.

(51) Int. Cl.
*H04L 51/18*     (2022.01)
*G06F 3/04817*     (2022.01)
*G06F 3/0482*     (2013.01)

(52) U.S. Cl.
CPC .......... *H04L 51/18* (2013.01); *G06F 3/04817* (2013.01); *G06F 3/0482* (2013.01)

(58) Field of Classification Search
CPC ... H04L 51/18; G06F 3/04817; G06F 3/0482; G06Q 10/10; G06Q 30/018;
(Continued)

(56) References Cited

U.S. PATENT DOCUMENTS 6,871,006 B1   3/2005 Oguz et al.
7,362,946 B1   4/2008 Kowald
(Continued)

FOREIGN PATENT DOCUMENTS

AU   2017100670 A4   7/2017
CN   101808152 B    10/2012
(Continued)

OTHER PUBLICATIONS

"International Application Serial No. PCT/US2023/024315, International Search Report mailed Sep. 19, 2023", 3 pgs.
(Continued)

*Primary Examiner* — Cao H Nguyen
(74) *Attorney, Agent, or Firm* — Schwegman Lundberg & Woessner, P.A.

(57) ABSTRACT

Methods and systems are disclosed that access relationship data of a first user of an interaction system to identify a second user of the interaction system associated with the first user, cause presentation of identification information for the second user within an interaction interface and, responsive to identifying an event pertaining to the second user, cause presentation of a call-to-action graphical element associated with identification information of the second user within the interaction interface. Responsive to detecting user selection of the call-to-action graphical element, the methods and systems invoke an interaction function to facilitate an interaction between the first user and the second user. The interaction function includes at least one of a communication function enabling the first user to communicate digital content to the second user using the interaction system, and an augmentation function enabling the first user to augment the digital content using an augmentation graphical feature.

20 Claims, 15 Drawing Sheets

(58) Field of Classification Search
CPC .............. G06Q 30/0201; G06Q 30/01; G06Q 30/0241; G06Q 50/01; G06N 20/00
See application file for complete search history.

(56) References Cited

U.S. PATENT DOCUMENTS

| | | |
|---|---|---|
| 9,396,354 B1 | 7/2016 | Murphy et al. |
| 9,482,882 B1 | 11/2016 | Hanover et al. |
| 9,482,883 B1 | 11/2016 | Meisenholder |
| 9,838,730 B1 | 12/2017 | Matias |
| 10,178,365 B1 | 1/2019 | Singh et al. |
| 10,348,662 B2 | 7/2019 | Baldwin et al. |
| 10,348,960 B1 | 7/2019 | Sehn |
| 10,354,425 B2 | 7/2019 | Yan et al. |
| 10,380,394 B1 | 8/2019 | Boyd et al. |
| 10,540,575 B1 | 1/2020 | Brody |
| 10,580,458 B2 | 3/2020 | Sehn |
| 10,623,891 B2 | 4/2020 | Sehn et al. |
| 10,638,256 B1 | 4/2020 | Suiter |
| 10,691,967 B2 | 6/2020 | Zak et al. |
| 10,754,525 B1 | 8/2020 | Al Majid et al. |
| 10,783,927 B1 | 9/2020 | Davis |
| 10,805,696 B1 | 10/2020 | Suiter et al. |
| 10,839,219 B1 | 11/2020 | Suiter et al. |
| 10,893,055 B2 | 1/2021 | Allen et al. |
| 10,956,793 B1 | 3/2021 | Wang et al. |
| 10,984,547 B2 | 4/2021 | Ezra et al. |
| 10,990,697 B2 | 4/2021 | Murphy et al. |
| 10,997,758 B1 | 5/2021 | Yan et al. |
| 11,044,393 B1 | 6/2021 | Suiter et al. |
| 11,099,643 B1 | 8/2021 | Miller et al. |
| 11,128,715 B1 | 9/2021 | Al Majid et al. |
| 11,153,665 B2 | 10/2021 | Beck et al. |
| 11,157,558 B2 | 10/2021 | Beck et al. |
| 11,201,981 B1 | 12/2021 | Suiter et al. |
| 11,216,869 B2 | 1/2022 | Allen et al. |
| 11,227,637 B1 | 1/2022 | Collins et al. |
| 11,297,399 B1 | 4/2022 | Tang |
| 11,301,960 B2 | 4/2022 | Chang et al. |
| 11,308,653 B2 | 4/2022 | Yoon et al. |
| 11,349,796 B2 | 5/2022 | Tang |
| 11,372,608 B2 | 6/2022 | Sehn |
| 11,388,226 B1 | 7/2022 | Anderton et al. |
| 11,496,544 B2 | 11/2022 | Pavlovskaia et al. |
| 11,563,886 B2 | 1/2023 | Bartow et al. |
| 2003/0160944 A1 | 8/2003 | Foote et al. |
| 2005/0187912 A1 | 8/2005 | Matsa et al. |
| 2005/0286519 A1 | 12/2005 | Ravikumar et al. |
| 2006/0271696 A1 | 11/2006 | Chen et al. |
| 2007/0280452 A1 | 12/2007 | Bernard |
| 2008/0016114 A1 | 1/2008 | Beauregard et al. |
| 2008/0045176 A1 | 2/2008 | Ho et al. |
| 2008/0092168 A1 | 4/2008 | Logan et al. |
| 2010/0183280 A1 | 7/2010 | Beauregard et al. |
| 2012/0278710 A1 | 11/2012 | Berger et al. |
| 2013/0042169 A1 | 2/2013 | Reedy |
| 2013/0077937 A1 | 3/2013 | Kennedy et al. |
| 2015/0160916 A1 | 6/2015 | Lothian |
| 2015/0279427 A1 | 10/2015 | Godfrey et al. |
| 2016/0196052 A1 | 7/2016 | Franklin et al. |
| 2017/0357382 A1 | 12/2017 | Miura et al. |
| 2018/0026925 A1 | 1/2018 | Kennedy |
| 2018/0089904 A1 | 3/2018 | Jurgenson et al. |
| 2018/0188899 A1* | 7/2018 | Nigam ............... G06Q 10/1095 |
| 2018/0191797 A1 | 7/2018 | Javier et al. |
| 2018/0348966 A1* | 12/2018 | Scoville .................. H04L 51/52 |
| 2018/0357634 A1* | 12/2018 | Shin ....................... G06Q 20/36 |
| 2019/0012765 A1 | 1/2019 | Egri et al. |
| 2019/0140990 A1 | 5/2019 | Rabbat et al. |
| 2019/0392866 A1 | 12/2019 | Yoon et al. |
| 2020/0004829 A1* | 1/2020 | Denton .................. H04L 67/306 |
| 2020/0201969 A1 | 6/2020 | Jo et al. |
| 2020/0320767 A1 | 10/2020 | Al Majid et al. |
| 2020/0353366 A1 | 11/2020 | Titus |
| 2020/0366395 A1 | 11/2020 | Brenner et al. |
| 2020/0409729 A1 | 12/2020 | Al Majid |
| 2020/0412864 A1 | 12/2020 | Al Majid et al. |
| 2021/0014238 A1 | 1/2021 | Allen et al. |
| 2021/0136521 A1 | 5/2021 | Al Majid et al. |
| 2021/0144422 A1 | 5/2021 | Wagner et al. |
| 2021/0304469 A1 | 9/2021 | Heikkinen et al. |
| 2021/0336916 A1 | 10/2021 | Boyd et al. |
| 2022/0086340 A1 | 3/2022 | Ebsen et al. |
| 2022/0319552 A1 | 10/2022 | Collins et al. |
| 2022/0375137 A1 | 11/2022 | Anvaripour et al. |
| 2022/0406008 A1 | 12/2022 | Jurgenson et al. |
| 2023/0004278 A1 | 1/2023 | Anvaripour et al. |
| 2023/0344953 A1 | 10/2023 | Anvaripour et al. |
| 2024/0397156 A1 | 11/2024 | Belosludtcev et al. |

FOREIGN PATENT DOCUMENTS

| | | |
|---|---|---|
| CN | 119301554 A | 1/2025 |
| EP | 1587111 A1 | 10/2005 |
| JP | 2003141038 A | 5/2003 |
| WO | WO-2022072689 A1 | 4/2022 |
| WO | WO-2022212127 A1 | 10/2022 |
| WO | WO-2023235584 A1 | 12/2023 |

OTHER PUBLICATIONS

"International Application Serial No. PCT/US2023/024315, Written Opinion mailed Sep. 19, 2023", 4 pgs.

"U.S. Appl. No. 18/322,397, Notice of Allowance mailed Jan. 13, 2025", 11 pgs.

"International Application Serial No. PCT/US2023/024315, International Preliminary Report on Patentability mailed Dec. 12, 2024", 6 pgs.

* cited by examiner

CONTEXTUAL REPLY AUGMENTATION SYSTEM

CLAIM OF PRIORITY

This application claims the benefit of priority to U.S. Provisional Application Ser. No. 63/348,305, filed on Jun. 2, 2022, which is incorporated herein by reference in its entirety

TECHNICAL FIELD

The present disclosure relates generally to user interaction on communication platforms and more specifically, to context-based initialization and augmentation of reply interactions.

BACKGROUND

In order to increase user engagement and long-term loyalty, social media and messaging platforms develop features that enrich user interaction or increase the frequency and quality of exchanges between users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
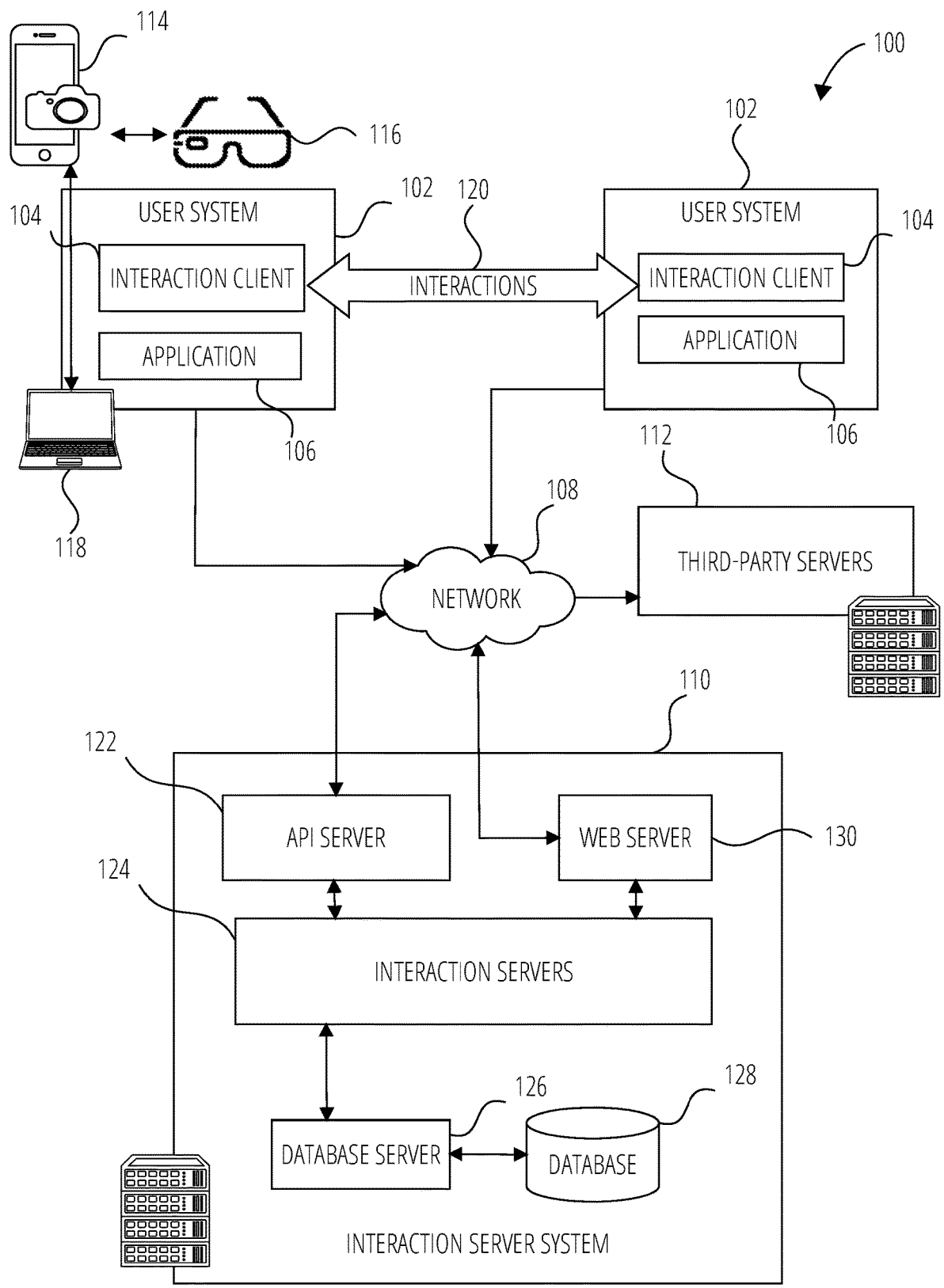
FIG. 1 is a diagrammatic representation of a networked environment in which the present disclosure may be deployed, according to some examples.

In order to increase user engagement and long-term loyalty, social media and messaging platforms develop features that enrich user interaction or intensify the frequency of user exchanges. However, conventional techniques are lacking with respect to enabling platforms to identify and showcase reasons or opportunities for a first user to start and conduct a meaningful, engaging and convenient interaction with a second user. Conventional techniques do not allow platforms to effectively detect events, such as profile changes or characteristics of past user interactions, which merit a follow-up on the part of one or more users. Furthermore, conventional techniques require complex interaction patterns, involving multiple steps in the context of multiple user interfaces, in order to enable a first user to start an interaction with a second user in the context of a given event, select and augment digital content, and sent it to the second user. Complex interaction patterns lead to a suboptimal user experience, especially on mobile devices whose limited screen real estate make it difficult to navigate such multiple or complex user interfaces.

The disclosure herein describes examples of a method and system that address the drawbacks of conventional techniques in social media and messaging platforms. An example method includes accessing relationship data related to a first user of an interaction system to identify a second user of the interaction system associated with the first user. In some examples, the second user is one of a set of users of the interaction system associated with the first user. The method presents identification information for each user of the set of associated users within an interaction interface. In some examples, identification information for each user of the set of users comprises a user name and/or an avatar. The method further includes identifying an event pertaining to the second user of the interaction system, and, responsive to the identifying of the event pertaining to the second user, presenting a call-to-action (CTA) graphical element in association with identification information of the second user within the interaction interface. Responsive to detecting a user selection of the CTA graphical element within the interaction interface, the method invokes an interaction function to facilitate an interaction between the first user and the second user. In some examples, the interaction function comprises a communication function to enable the first user to communicate digital content to the second user, using the interaction system. In some examples, the communication function is a reply camera function to enable the first user to capture at least one of a digital image or a digital video for communication to the second user, using the interaction system. In some examples, the interaction function comprises an augmentation function to enable the first user to augment the digital content using an augmentation graphical feature.

In some examples, the augmentation graphical feature corresponds to an event type of the event pertaining to the second user. In some examples, the event pertaining to the second user of the set of users comprises the creation or establishment of a recorded relationship between the first user and the second user of the interaction system. In some examples, the augmentation graphical feature indicates one or more of a set of recommended content augmentations. In some examples, the event type of the event pertaining to the second user is a birthday event type, and the augmentation graphical feature is a birthday celebration graphical element. In some examples, each user in the set of associated users is associated with the first user based on a bidirectional relationship. In some examples, each user in the set of associated users is associated with the first user based on a unidirectional relationship. In some examples, each user in the set of associated users is associated with the first user based on a bidirectional relationship or a unidirectional relationship. In some examples, some or all such relationships are recorded relationships.

In some examples, identifying an event pertaining to the second user includes applying one or more trigger criteria to user data of the second user, and determining that the second user meets one or more trigger criteria. In some examples, identifying an event pertaining to the second user includes applying one or more trigger criteria to user data of one or more other users associated with the second user. In some examples, the user data is at least one of user profile data and user message data. In some examples, the user profile data includes profile field data for a specific user (such as the first or second user), or for multiple users. In some examples, user message data includes message or note history for one or more users, history of interactions between two or more users, and so forth.

In some examples, applying one or more trigger criteria to user data of the second user comprises applying a machine learning model to the user data to determine or more characteristics of the user data; and determining that the second user meets one of the one or more trigger criteria comprises determining that a characteristic of the user data for the second user meets one of the one or more trigger criteria. Examples of triggers include a friend's birthday, a friend's post or change to their profile, or certain topics of discussion in a chat window.

In some examples, an interaction trigger criterion or criterion type determined to be applicable to the second user (such as an event type or event) is mapped to one or more content augmentations. In some examples, the method assesses contextual data to determine a set of relevant content augmentations, corresponding to content augmentations that would fit best, such as a "happy birthday" content augmentation when it is a friend's birthday. In some examples, the method causes the display next to the second user, in a listing of identified associated users, of a selectable user interface element (e.g., a selectable icon) that when selected displays a set of one or more augmentation graphical features, each corresponding to at least one relevant content augmentation. Recommending relevant content augmentations creates inspiration for users, lowers the effort required to send augmented content between users, increases conversion rates of content augmentations, and improves overall user engagement. For example, next to the user with the birthday, the method displays a selectable user interface element, such as a selectable icon, that when selected, displays, via one or more augmentation graphical features, a set of recommended content augmentations. Upon selection of a particular augmentation graphical feature, a system implementing the method opens a camera feed that initially applies the relevant selected content augmentation to content captured by a camera system. The user then takes a photo or records a video, and sends it to the friend.

In some examples, the method determines which content augmentation to recommend based on historical conversion rates. The method determines preferences of users for certain types of content augmentations in similar contexts based on prior types of content augmentations displayed to the user and user selections. In some examples, the method identifies conversion rates for the particular friend associated with the trigger. In other examples, the method determines conversion rates for the general population or a subset thereof, such as based on characteristics of the user or the friend (e.g., age, gender, location, other personal identifiable information, and/or the like).

In some examples, the method applies one or more machine learning models. In some examples, a machine learning model is trained to identify relevant context of a chat discussion between users, such as the main topic of discussion. Another machine learning model is trained to identify the most relevant content augmentations based on a certain trigger and/or preferences of users, such as the most relevant content augmentations for birthdays or identifying the most effective content augmentation for a particular friend.

In some examples, the content augmentation adds digital elements to content captured by a camera system, such as by modifying, overlaying, altering, or otherwise augmenting such camera content. The user has the option to transmit a live stream or capture a photo or video to send to a person. The content augmentation may recognize objects or features, such as facial features and movements, and may overlay fun animated effects, such as a hat, or change a face in real-time. Advantageously, providing relevant content augmentations to users can encourage users to communicate with other users. Tying the content augmentation recommendations with triggers that are tied to activities, interactions, or profiles of users enhances the relevance of such content augmentations. Moreover, the method applies different types of triggers, such as triggers for the application user, user's friends (e.g., birthday), activity between the two (e.g., topics of discussion in a chat), and other external information (e.g., time of the day, holidays, weather) to identify the most relevant content augmentations. The method can identify interactions between users within sub-modules of the application such as a game with two players or external applications (e.g., see linked applications). Suggesting relevant content augmentations to users provide inspiration for users to connect with each other. Furthermore, providing such content augmentation recommendations on a user interface or on a listing of friends lowers the amount of effort (e.g., clicks on the user interface) to send an Extended Reality (XR)-augmented photo or video to a friend.

Example embodiments described herein allow a first user to be presented with a reminder about a friend's birthday, a notice that a friendship-related anniversary is taking place, or an alert that a new connection or relationship has been established between the first user and a second user. Given an identified event, characteristic or update of interest, example embodiments provide a convenient way for the first user to initiate a related interaction with a second user, such as the friend having a birthday. Furthermore, example embodiments allow for an engaging interaction, such as one that includes text, image or video content enriched by content augmentations (for example, a birthday celebration-themed filter may be applied to a picture of a friend having a birthday). To maximize user convenience, given the limited user interface real estate of popular mobile devices, example embodiments reduce the number of operations or graphical user interfaces needed to showcase users with interesting updates or events and to send them augmented content. To inspire users and improve user engagement, example embodiments identify and present relevant content augmentations for further user selection.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an electronic interaction process. Computing resources used by one or more machines, databases, or networks may thus be more efficiently utilized or even reduced. Although an example method in this disclosure depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
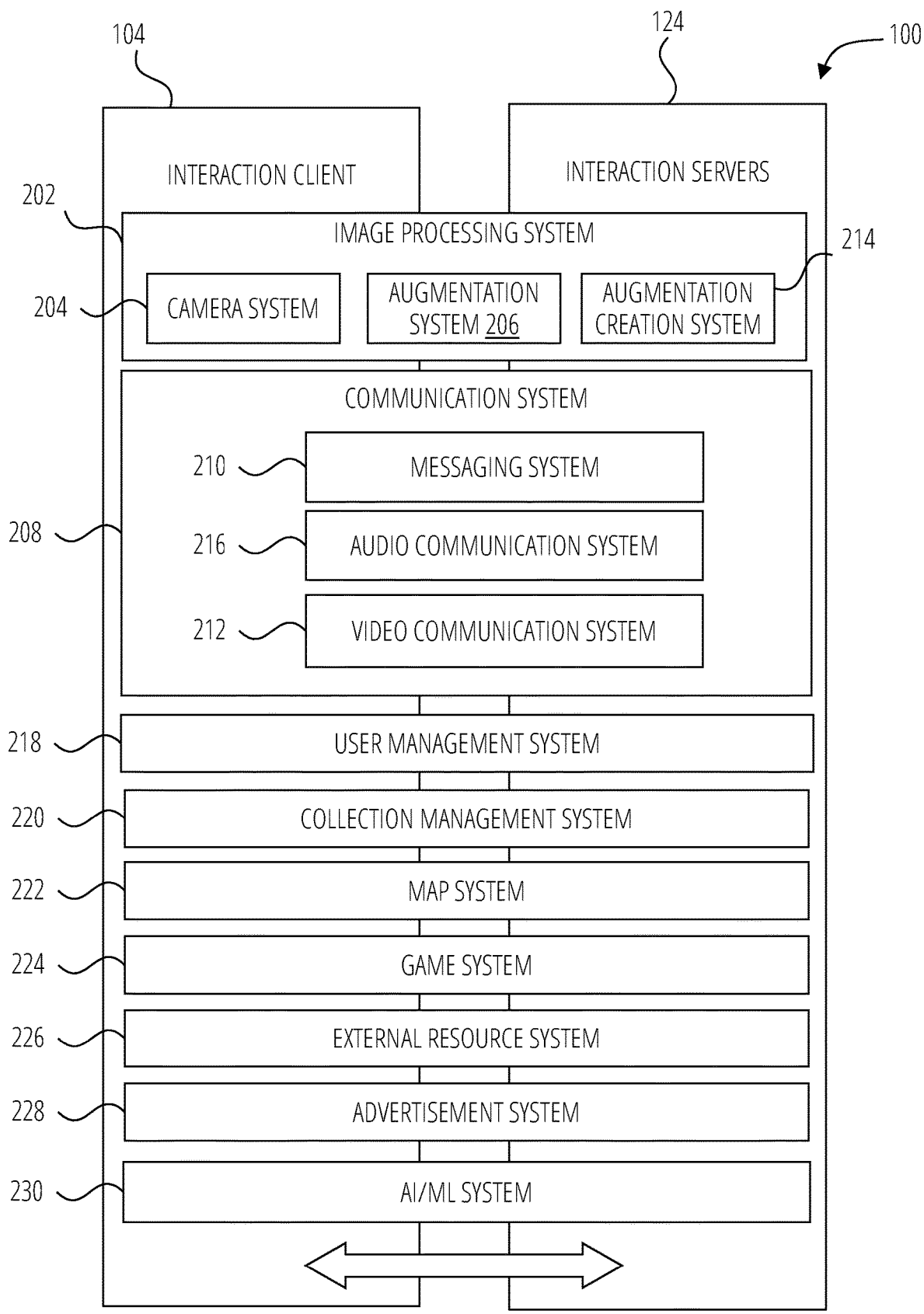
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1302 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104.

The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
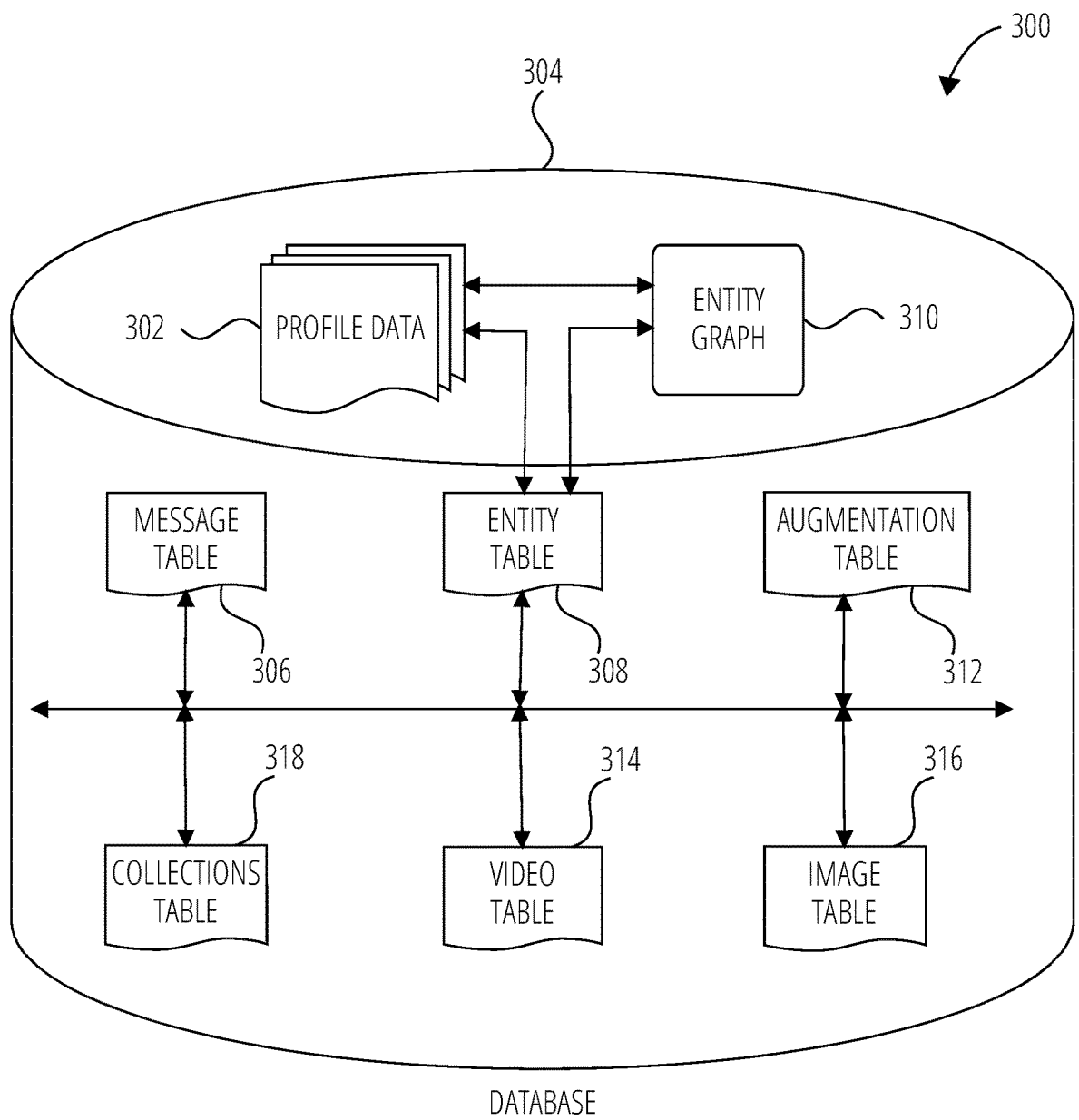
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Contextual Reply Augmentation System

Figure 4:
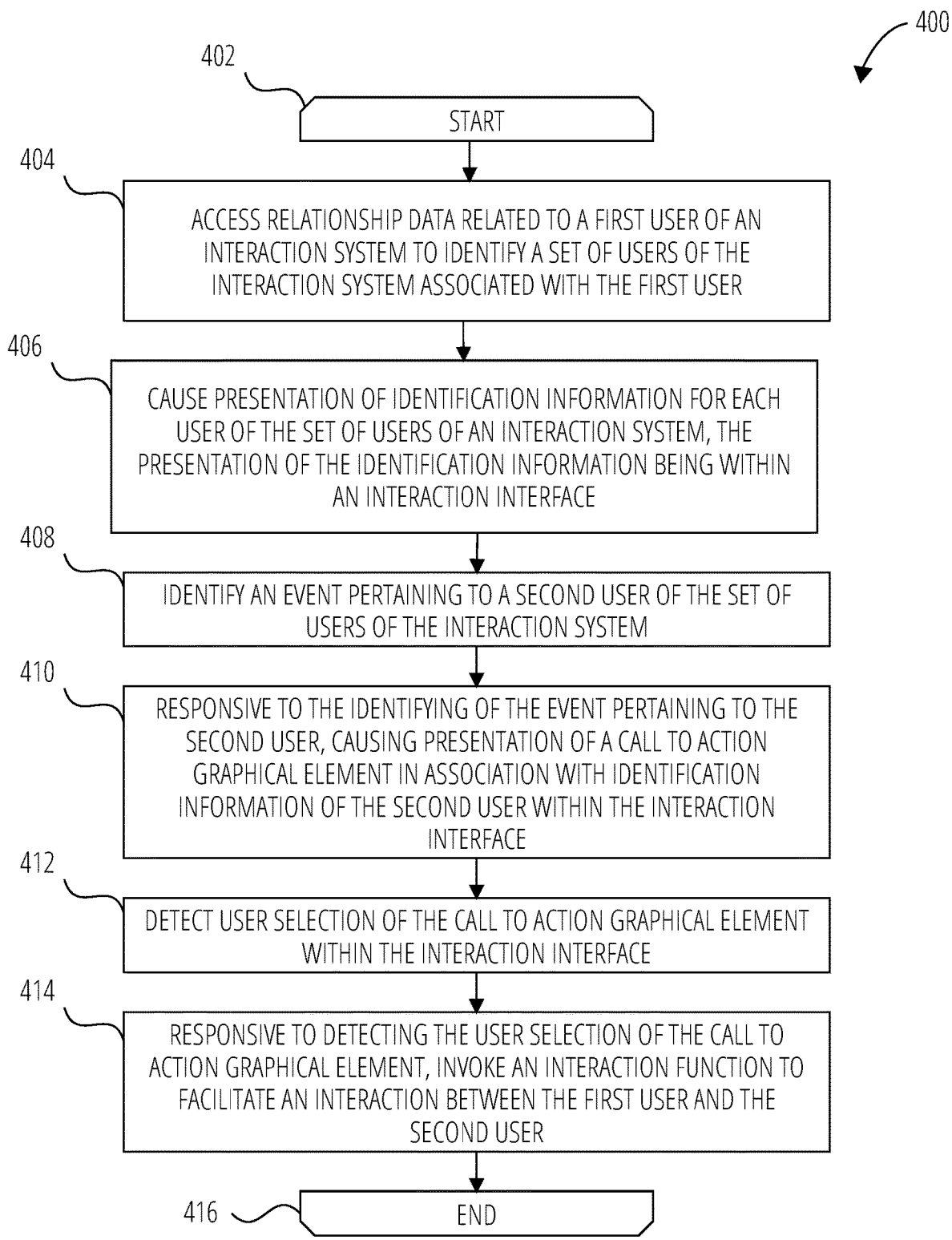
FIG. 4 is a flowchart illustrating a method for facilitating an interaction between users, according to some examples.

FIG. 4 is a flowchart illustrating a method 400, according to some examples, that may be executed by the interaction client 104 to facilitate an interaction between users of the interaction system 100. The operations of the method 400 are discussed with reference to the user interface diagrams shown in FIG. 5 and FIG. 6.

The method 400 commences at start operation 402, and progresses to operation 404, where the interaction system 100 (e.g., via a user system 102 or interaction server system 110) accesses relationship data (for example, from entity graph 310), for a first user of the interaction system 100 to identify a set of other users of the interaction system 100, each of which is associated with the first user. In some examples, the first user is logged into the interaction system 100. In some examples, the first user is a currently active user (for example, a user who is logged in, and who is using, at the time of the method's execution or shortly before, a relevant messaging or interaction capability or application of an interaction client 104 or interaction server system 110). In some examples, the first user may be logged into the interaction system 100 and may have been idle for a number of minutes or hours.

In some examples, the set of other users identified includes at least a second user of the interaction system. In some examples, the association between other users and the first user takes the form of a recorded relationship with the first user. As noted above with respect to FIG. 3, such relationships may be bidirectional "friend" relationships which include communication or publication authorizations between the first user and the users of the set of other users. In some examples, such relationships are unidirectional "subscription" relationships between a user and a commercial publishing entity. In some examples, other users that are associated with the first user (such as within an interaction function of the interactive system) include followers or friends, where users can follow or be followed by others, or form some form of relationship such that other users can see certain information, such as each other's posts on their feeds. In some examples, the set of other users can include "close" or "best" friends that can create a relationship to share additional information not available to others, such as private posts, targeted sharing of content, and/or the like. In some examples, associated users are users mentioned or tagged in a user's posts, comments, chat messages, or other communication that draws the attention of a tagged user and/or can initiate conversations or discussions. In some examples, associated users are users that are involved in a message chat with the first user, such as a private messaging feature that allows users to send messages directly to one another or group chats among many users. In some examples, associated users are users that joined a group based on shared interests or common goals. Within these groups, users can interact and form relationships based on the group's focus and/or share information among group members. In some examples, associated users are users who express or receive support through likes, comments, or shares (for example, express or receive support from the first user). In some examples, associated users are influencers or brand ambassadors that have established large followings and are seen as authorities or trendsetters in their niches. In some examples, associated users are collaborators working together on projects or creating content together (for example, together with the first user).

Figure 5:
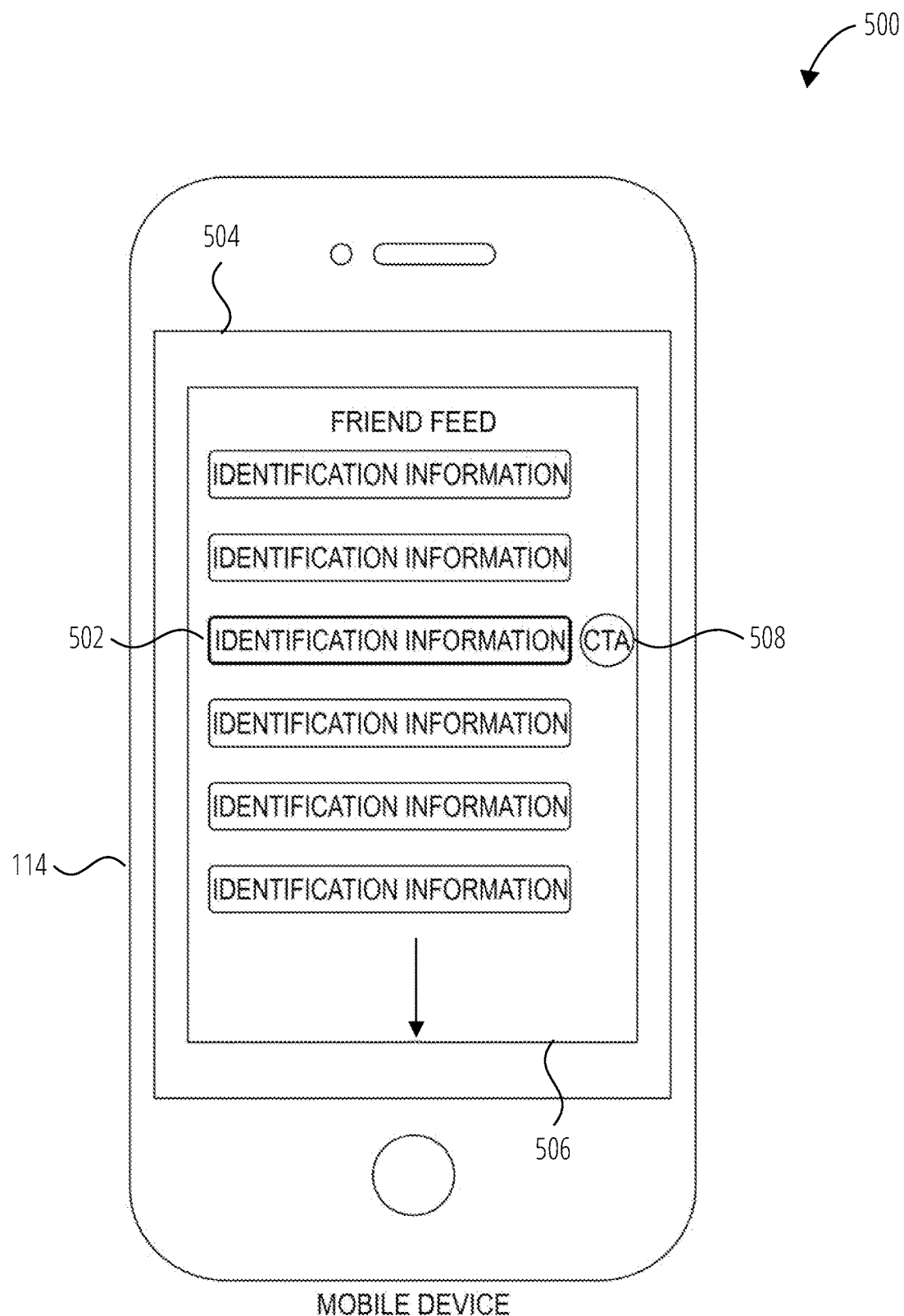
FIG. 5 is a user interface diagram, according to some examples.

At operation 406, and referencing FIG. 5, the interaction client 104 operating on the mobile device 114 (e.g., a mobile device 114 or a head-wearable apparatus 116) causes presentation of identification information for each user of the set of other users within a chat interface 504 on a mobile device 114 (for example, see identification information 502). The identification information includes a user name, an avatar, and status information, for example. In some examples, the chat interface 504 includes a listing of identified associated users in the form of a friend feed 506, which may include users online and available for communication (e.g., a chat) with the first user. In some examples, a listing of associated users can be a listing of friends, a listing of historical chats between the first user and other users, or other listings of other associated users, a phone book, missed calls, received calls, call history, and/or the like. In some examples, the interaction client determines that a listing of associated users is to be displayed upon a user selecting an interface option on an application (such as a mobile application), upon a user opening the mobile application, or other user interaction with the application. In other examples, the interaction client initiates the method at operation 406 based on other factors, such as a chat message or other interaction (or historical interaction) between the user and other users, or such as not having any unread messages.

At operation 408 the interaction system 100 identifies an event pertaining to a second, specific user of the set of interaction system 100 for whom identification information 502 is shown within the chat interface 504. In some examples, identifying such an event includes determining that a second user of the interaction system 100 for whom identification information is shown within the chat interface 504 meets at least one interaction trigger criteria of one or more interaction trigger criteria. In some examples, identifying such an event includes determining that a specific user of a set of users of the interaction system 100 whose identification information is shown in chat interface 504 meets at least one interaction trigger criteria of one or more interaction trigger criteria, and selecting the specific identified user as the second user.

In some examples, trigger criteria include logic that is applied to user data associated with a first active user, a second user (or a specific user), and/or other users. In some examples, such user data may include user profile data or user message or interaction data for one or more users. User profile data refers to profile data for a given user of the system or application (a first user, a second user, and so forth), friends or other users that are linked with a given user, or other users of the interaction system. Similarly, user message data is message, note or interaction data (such as message history, interaction history, and so forth) for a given user, friends or other users linked with the given user, or other users of the interaction system. In some examples, the trigger criteria include logic that is applied to other types of data, such as a time of the day, a day of the week, a day of the month, or a holiday.

An example interaction trigger criterion (a trigger criterion for short) corresponds to the occurrence of an event, such as an anniversary event relating to a second user (a birthday, a wedding anniversary, a friendship anniversary such as an anniversary of the creation or establishment of a recorded relationship between two users), a change to the second user's profile, a post from the second user, and so forth. In some examples, the interaction system 100 identifies a birthday of a second (or specific) user and determines whether the second user's birthday matches the current date or an upcoming date to determine whether an example birthday trigger criterion has been met. A trigger criterion met by the second user may also refer to the creation or establishment of a newly recorded (or recently recorded) relationship between the first user and the second user (e.g., the second user has recently become a "friend" of the first user). In some examples, the method applies one or more machine learning models. In some examples, a machine learning model is trained to identify relevant context, such as a subset of user data, a derived version of user data (e.g., a main topic of discussion generated based on chat discussion between users), and so forth. Another machine learning model may be trained to detect whether one or more trigger criteria apply to the user data.

At operation 410, responsive to identifying an applicable trigger criterion (such as an event) pertaining to a second user, the interaction system 100 causes presentation of a call-to-action (CTA) graphical element 508 within the chat interface 504 on a mobile device 114, as shown in FIG. 5. The CTA graphical element 508 is presented or displayed in association with, or adjacent to, the identification information 502 of the second user, in the context of a listing of users associated with the first user (such as a friend feed 506). In one example, the CTA graphical element 508 is an icon or button that is user-selectable and is identified as a call-to-action by either its content or a tooltip. The CTA graphical element 508 can be presented or displayed based on a predetermined period of time, predetermined maximum number of impressions (impression cap), and/or the first user taking action such as replying, interacting with the second user and/or invoking a content augmentation function, as seen below. In some examples, the predetermined period of time and/or the predetermined maximum number of impressions (impression cap) varies depending on the type of event. In some examples, the CTA graphical element 508 is displayed or presented for 24 hours (or other predefined time period) in the case of an anniversary event, a wedding, or a birthday. In some examples, the CTA graphical element 508 is displayed or presented for 48 hours (or other predefined time period) in the case of a "Missed call" event. In some examples, the CTA graphical element 508 is displayed for 15 minutes up to 1 day (or other predefined time period) in the case of a "Reply to message" event. In some examples, the CTA graphical element 508 is seen by a user up to 10 times (for example, the number of allowed impressions can be 3, 5, 10, etc.). If the maximum number of allowed impressions (e.g., the impression cap) has been reached and/or the predetermined period of time associated with the display of the CTA graphical element 508 has been reached, the CTA graphical element 508 is no longer displayed.

Returning to FIG. 4, at operation 412, the interaction system 100 detects selection, by the first user in the context of the chat interface 504, of the CTA graphical element 508 associated with the second user. At operation 414, responsive to the selection, the interaction system 100 invokes an interaction function to facilitate interaction between the first user and the second user. The interaction function that is invoked by the selection of the CTA graphical element 508 is a communication function that enables the first user to communicate digital content (e.g., a digital image or a digital video), selected or generated by the first user, to the second user using the interaction system 100. In one example, the communication function is a reply camera function that enables the first user to capture a digital image or a digital video, the reply camera function providing a series of interfaces that enable the convenient capture of the digital image or video and sending of that digital content to the second user.

In some examples, the invoked interaction function also comprises an augmentation function that enables the first user to augment captured or selected digital content (e.g., a captured digital image or a digital video) using an augmentation graphical feature (e.g., a lens or filter), before the digital content is communicated to the second user. The trigger criterion determined at operation 408 (or its type) is mapped to one or more augmentation graphical features. An augmentation graphical feature corresponds to one or more content augmentations (see at least FIG. 7 for a detailed discussion of identifying and recommending relevant content augmentations). For example, where a determined event is a birthday event, the augmentation graphical feature presented by the augmentation function can indicate a content augmentation matched to a birthday event, such as a birthday celebration lens or filter. The first user can selectively apply the birthday-themed lens or filter to a captured digital image and the lens or filter can also be automatically applied to the captured digital content (for example, if only one relevant augmentation graphical feature corresponding to a unique relevant content augmentation is applicable).

Table 1 below illustrates a non-exclusive listing of trigger criterion examples, and corresponding logic, including examples of matching the trigger criteria and/or their types to content augmentations and/or content augmentation types.

| Event | Logic |
|---|---|
| Friend's Birthday | Matching a current date with a birthday of a friend: matched to content augmentation related to birthdays |

| Event | Logic |
|---|---|
| New Friend in the feed | Recently added friend to user profile: matched to content augmentation related to welcoming others |
| New Group created | Recently created group: matched to content augmentation related to profile data of multiple users in the group |
| Pinned someone to feed | Friend pins first user in a post or feed in the past 24 hours: matched to content augmentation related to content of the post or feed |
| Missed a call | When user misses a call: matched to content augmentation related to historical content for and/or with the caller |
| Played a game with someone | In-game or played game in the past with user: matched to content augmentation related to the game or contextual information from interactions within the game |
| Friend made a screenshot | When a friend takes a screenshot: matched to content augmentation related to screenshots and/or content within the screenshot |
| Watched Friend's post in the feed | After watching a friend's post in a feed: matched to content augmentation related to content within the feed or between the friend and user |
| Mutual friends | Finding mutual friends: matched to content augmentation related to the mutual friend |
| Time of day - morning, evening, night | Local time of day: matched to content augmentation related to Morning/Midday/Evening |
| Holidays | Holidays from a friend's associated locations (current, birth, historical locations): matched to content augmentation related to holidays of these locations |
| Friend changed profile outfit | Friend changed profile outfit in the past 24 hours: matched to content augmentation related to profile outfits |
| Mentioned in a friend's post | A friend mentioned user in their posts: matched to content augmentation related to existing chat between the users |
| Successful call | After a successful call: matched to content augmentation related to conversations and/or contextual data on historical communications |
| Friend saved a message or post | When a friend saved a new message: matched to content augmentation related to the message or post |
| Chat reply | Received a message from a friend: matched to content augmentation related to conversation replies and/or the context in the chat |
| Streak | When there is a streak with a friend: matched to content augmentation related to the particular streak (e.g., streak of messages or posts between users) |

Figure 6:
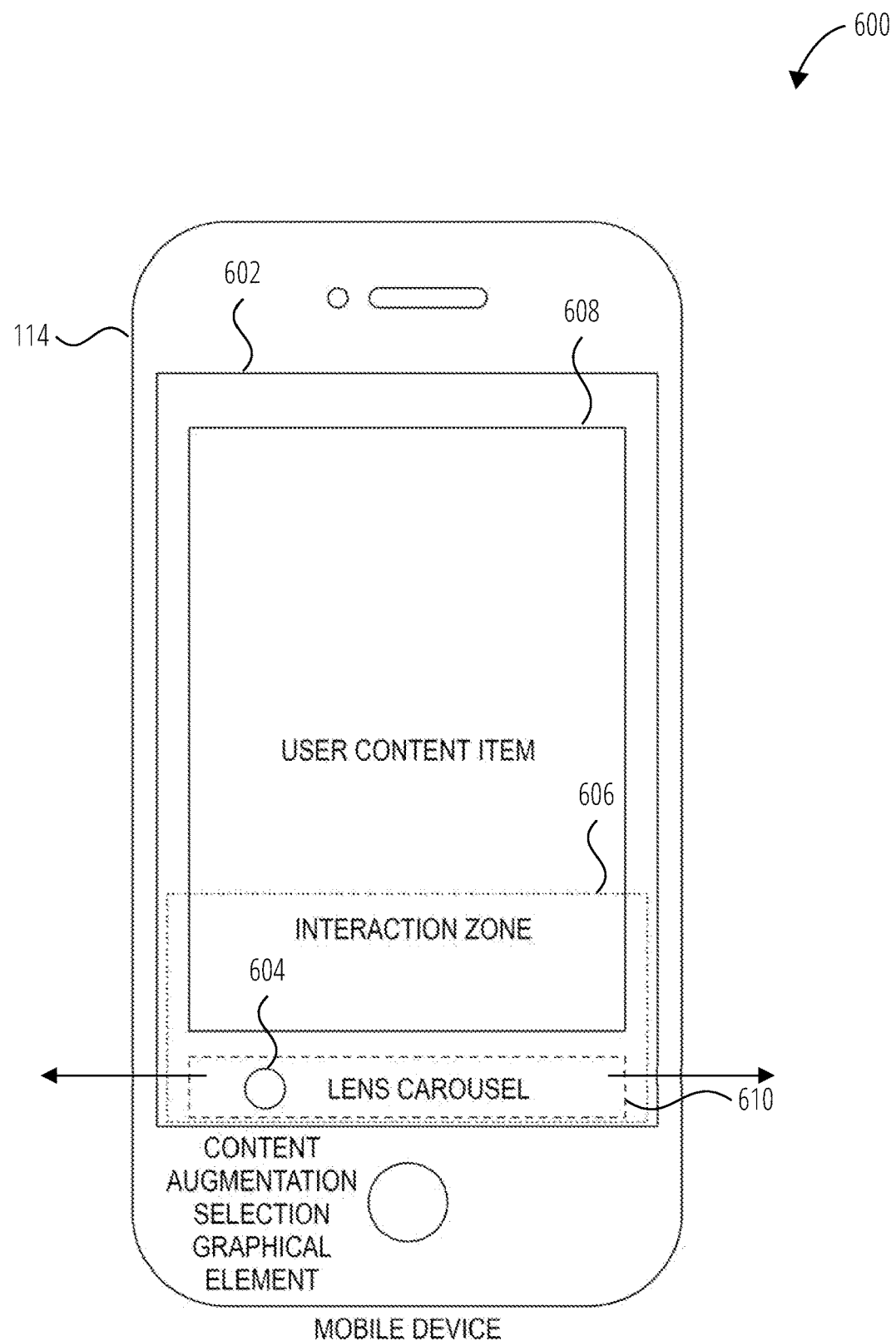
FIG. 6 is a user interface diagram, according to some examples.

FIG. 6 is a user interface diagram illustrating an example camera user interface 602, which is presented responsive to user selection of the CTA graphical element 508. In this example, the content augmentation selection graphical element 604 corresponds to the type of trigger criterion determined at operation 408 (for example, to a type of a detected event). More specifically, the camera user interface 602, according to some examples, is presented by an interaction client 104 in the example form of a media application executing on a mobile device 114. In some examples, the camera user interface 602 is presented on the optical display of a head-wearable apparatus 116. The camera user interface 602 presents a real-time feed from the camera of the mobile device 114, which the user can then capture as a still digital image or a digital video by selecting an appropriate option within an interaction zone 606 of the camera user interface 602.

The camera user interface 602 displays a user content item 608, such as a digital image or digital video captured by the camera of the mobile device 114. The user content item 608 can comprise image data, video data, audio data, or a combination of these data types, together with augmentation or modification data (e.g., stickers, filters, or lenses overlaid on the content item 608).

The camera user interface 602 also includes an interaction zone 606 with a function or tools section, in the example form of a lens carousel 610. The lens carousel 610 presents various tools and functions that may be invoked by a user of the mobile device 114 to interact with other users of the interaction system 100, to interact with content made accessible via the interaction system 100, and also to modify a captured user content item 608 displayed within the camera user interface 602. The interaction zone 606 includes a content augmentation selection graphical element 604 (e.g., a user-selectable icon) that is user-selectable to invoke an augmentation function (corresponding to an augmentation graphical feature, or a content augmentation) from a collection of augmentation functions. A selected augmentation function may then operate to augment or modify the user content item 608.

Figure 7:
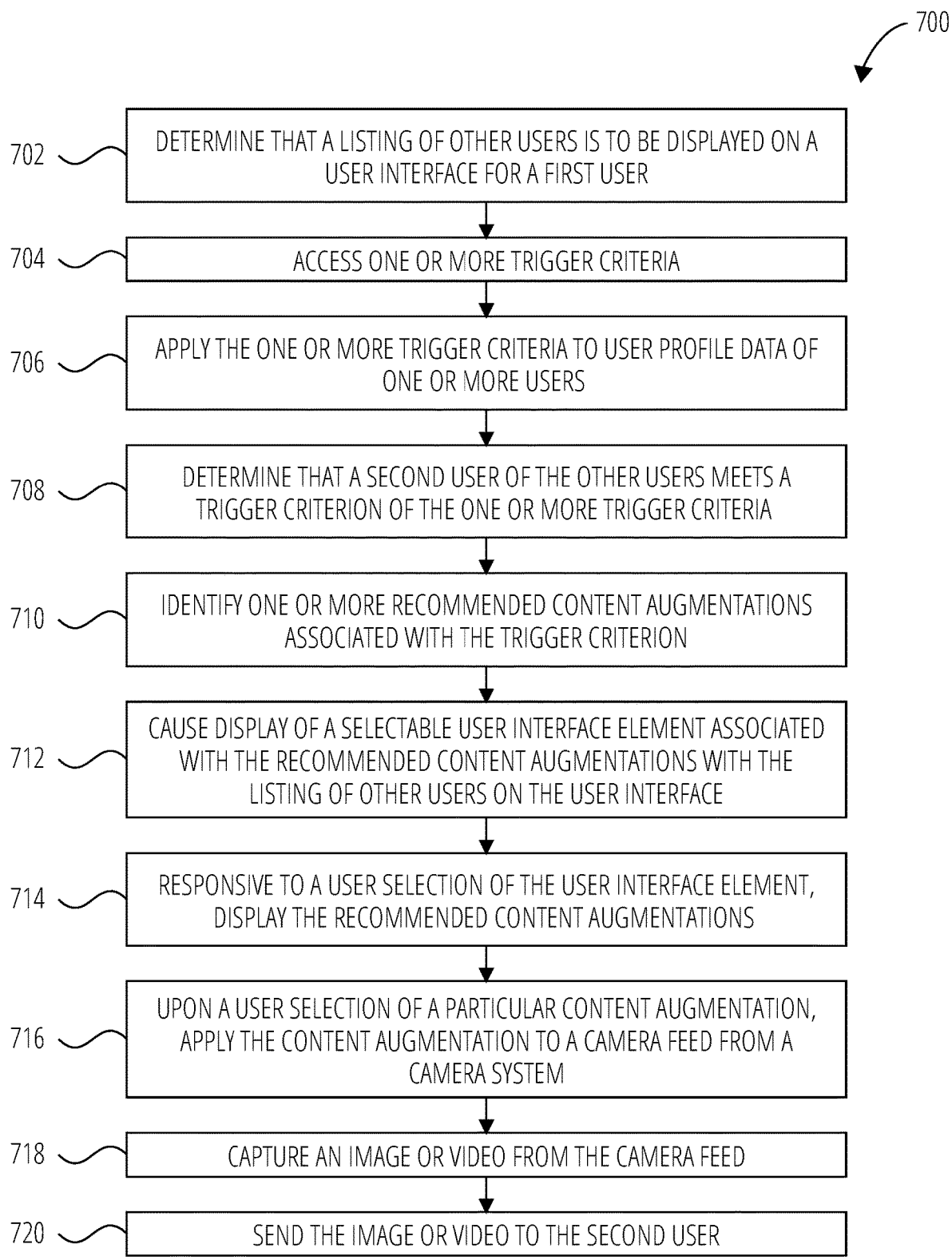
FIG. 7 is a flowchart illustrating a method for recommending content augmentations, according to some examples.

FIG. 7 is a flowchart illustrating a method 700 for recommending content augmentations, according to some examples, as implemented by interaction system 100.

At operation 702, the interaction system 100 (e.g., via user system 102 or interaction server system 110) determines that a listing of other users associated with a first user of the interaction system 100 is to be displayed on a user interface. Details about identifying associated users is described below with respect to FIG. 4.

At operation 704, interaction system 100 accesses one or more trigger criteria (e.g., referring to events or event types) and applies the one or more trigger criteria to user profile data corresponding to the one or more other users of the interaction system 100, at operation 706. In some examples, the interaction system 100 may use other or additional types of user data, such as user message data, without any limitations as to the scope of the disclosure. At operation 708, the interaction system 100 determines that a specific second user of the one or more other users meets at least one triggering criterion. In some examples, the first user is logged into the interaction system 100. In some examples, the first user is a currently active user (for example, a user who is logged in, and who is using, at the time of the method's execution or shortly before, a relevant messaging or interaction capability or application of an interaction client 104 or interaction server system 110). In some examples, the first user may be logged into the interaction system 100 and may have been idle for a number of minutes or hours.

At operation 710, the interaction system 100 identifies at least one recommended content augmentation associated with the trigger criterion. Trigger criteria are mapped to one or more content augmentations. For a particular trigger criterion, the interaction system accesses the mapping to identify a set of content augmentations to recommend. In some examples, the interaction system 100 applies a machine learning model trained to identify relevant content augmentations based on the type of trigger criterion. Some examples include a machine learning model that identifies relevant content augmentations for a single trigger or for multiple triggers. In some examples, the machine learning model can identify the most relevant content augmentations for a birthday trigger. In some embodiments, a machine learning model receives as input additional information such as context of interactions between users, user profile data, and/or the like to further narrow the recommended content augmentations.

The interaction system 100 determines that the user profile data meets one or more trigger criteria and selects one of the plurality of trigger criteria to use to recommend content augmentations. The trigger criteria are associated with priority values, that indicate a priority order for the content augmentations. For example, birthdays can have higher priority than missed calls. A priority value corresponds to the relative importance or relevance of a trigger criterion and associated content augmentations; in the case of multiple trigger criteria applicable to a user, the interaction system 100 may select the trigger criterion with the highest priority value, or the top K trigger criteria with the highest priority values (for a predetermined K, for example K=2 or K=3). In some examples, the interaction system 100 applies the trigger criterion that is met by the more recent user profile data, or more recently updated profile data. In other examples, the interaction system applies a weighting for particular trigger criteria based on data applied for the trigger criteria, priority values of trigger criteria, historical use of trigger criteria for the first user or the second user, and/or the like. In some examples, the interaction system assesses a plurality of user profiles to determine whether a particular trigger criterion is met. For example, a trigger criterion can require that the first user and the second user include a particular value in their profile, such as being in the same location.

In some examples, the interaction system 100 initially identifies a recommended set of content augmentations based on the trigger criterion and then identifies a subset of the mapped set of content augmentations by determining a preference of a type of content augmentation for the first user or other users based on historical selections of content augmentations by the first user or other users.

In operation 712, the interaction system 100 causes display of a first selectable user interface element associated with the at least one recommended content augmentation with the listing of other users on the user interface. In some examples, the first selectable user interface element is a selectable icon representing the recommended content augmentations (or recommended augmentation graphical features). In some examples, the interaction system 100 displays the first selectable user interface element (e.g., a selectable icon) adjacent to an identifier or the name of the second user. The interaction system 100 displays the listing of other users where users are placed in individual user interface cells. The interaction system 100 displays the first selectable user interface element within the user interface cell for the second user (see at least FIG. 8 and FIG. 9 for examples).

In some examples, the interaction system determines a number of recommended content augmentations to display based on a characteristic of the interaction client 104 that the first user is using. The interaction system 100 can limit a number of recommended content augmentations to display based on screen size. In some examples, the interaction system varies the number based on whether the interaction client 104 is a mobile device or a laptop screen, or based on a screen size for different mobile devices.

In some examples, the interaction system 100 removes the display of the first selectable user interface element in response to a lapse of a predetermined time period and/or upon use of a recommended content augmentation. The predetermined time period is associated with the trigger criterion. In some examples, a birthday trigger criterion expires in 24 hours or other predefined time period, whereas a missed call trigger expires after 2 days or other predefined time period. In some examples, if the trigger is still active but the first user navigates to a chat window with the user and sends a message without selecting the first selectable user interface element, the interaction system clears the trigger and does not show the first selectable user interface element going forward for the particular trigger criterion.

Still referring to FIG. 7, the interaction system 100 receives a user selection of the first selectable user interface element and displays the recommended content augmentations on the user interface at operation 714. The user interface includes a second user selectable interface element enabling the first user to scroll through multiple recommended content augmentations.

The interaction system 100 displays the recommended content augmentations based on a predetermined impression limit or impression cap (corresponding to the maximum number of allowed impressions) for each recommended augmentation. If a particular recommended content augmentation has received more than the maximum number of allowed impressions, it can be removed from the display. In other examples, the interaction system dynamically adjusts the impression limits (impression caps) based on conversion rates (e.g., rate at which a content augmentation was displayed and selected) for the first user, for the second user, for a general population, and/or for a subset of the population (e.g., users in a similar time zone, location, age range, ethnicity, education, occupation, marital status, income, and/or the like). In some examples, a recommended augmentation that has been consistently or preferentially selected by a first or second user, and/or a subset of the population may be assigned a higher impression limit which can have the effect of displaying it for a longer period of time.

The interaction system 100 applies the content augmentation to a camera feed from a camera system at operation 716, captures an image or video from the camera stream at operation 718, and sends the image or video to a user system 102 of a second user at operation 720. According to some examples, the interaction system 100 applies a birthday content augmentation to a camera feed for the first user, captures a video where the camera feed for the first user is modified to include a birthday hat and balloons in the background, and sends the captured video to a user system 102 of a specific second user on the second user's birthday.

The interaction system 100 allows efficient use of the user interface, reducing the number of graphical user interfaces needed to send video or image with content augmentation to a particular user. In traditional augmentation processes, a user identifies something related to a friend, such as from a third party application, opens a mobile application for the interaction system, selects the option to open a camera, searches for a particular content augmentation from a complete database of content augmentations based on a search query, records a video or image with the content augmentation applied, saves the recording locally onto an interaction client, opens a messaging application, finds the friend on the messaging application, opens a chat window with the friend, and finally attaches the locally saved video or image to send to the second user. In stark contrast, the interaction system 100 described herein automatically retrieves user profile data to apply to trigger criteria that are mapped to relevant content augmentations. Moreover, the interaction client 104 displays a selectable icon for the user to directly access the content augmentations right on the list of users.

Advantageously, the interaction system according to some examples provides a practical solution to a technical problem of limited user interface real estate, complex navigation in a user interface, or both. The interaction system automatically identifies relevant context augmentations using user profile data and displays options to access such recommended context augmentations right on the listing of users. The icon enables a user to directly access a camera feed with a context augmentation applied, and enables the user to record and send a picture or video directly to the friend for which the context augmentation is recommended. Moreover, given the limited user interface real estate with smaller computing devices, the interaction system can display an icon within the same cell of the friend for user access to recommended content augmentations. Thus, the technical problem of navigating through numerous graphical user interfaces to send an augmented picture or video is solved by the practical solution of automatically applying augmentation trigger criteria to user profile data.

Figure 8:
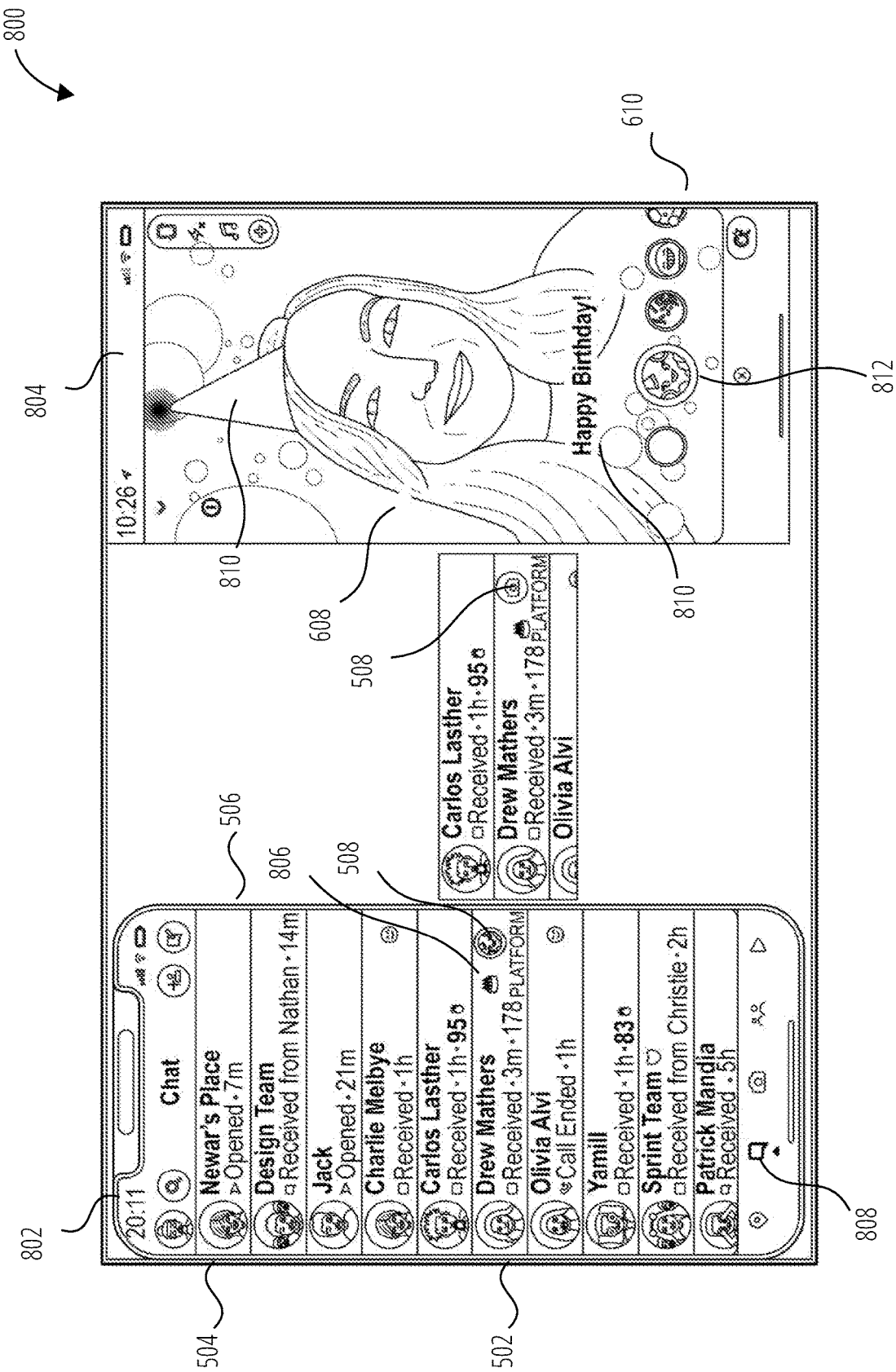
FIG. 8 is a user interface diagram, according to some examples.

FIG. 8 is a user interface diagram 800 showing a friend feed user interface 802 and a reply camera user interface 804, according to some examples of the chat interface 504 and the camera user interface 602, respectively. In this example, the friend feed user interface 802 displays a friend feed 506, in the form of a listing of other associated users (e.g., friends of a first user), or in the form of a listing of historical chats with those individual users. The user interface is displayed on an interaction client of a first user. The first user selects a selectable user interface element 808 to see a listing of historical chats. The interaction client displays user interface cells for the listing of users, where each user that is being displayed is assigned to a particular user interface cell. In some examples, the user interface cell for each user includes a profile image or animated character of the user, the name of the user, the last communication with the user, and so forth.

The interaction client retrieves profiles for one or more individuals that are listed in the feed. In some examples, referring to the interaction client 104 and the user management system 218, the interaction client accesses trigger criteria from the user management system to determine whether any of the individuals on the list meet the augmentation trigger criteria.

The friend feed 506 includes identification information 502 for a second user associated with the first user, whose profile data includes data that satisfies the birthday trigger criterion to detect a birthday event. In some examples, applying the trigger criterion includes logic checking whether a user's birthday matches the current date. In some examples, the user interface cell for the second user information 502 includes a profile image or animated character of the second user, the name of the second user, the last communication with the second user (e.g., message or call received 3 minutes ago), and so forth.

In some examples, responsive to determining that the user data of the second user meets the birthday trigger criterion, a CTA graphical element 508 is presented within the friend feed user interface 802, in the vicinity of the identification information for the second user. In some examples, the CTA graphical element 508 itself identifies a particular augmentation graphical feature in the form of a lens (here, pre-selecting birthday lens 812). In a different representation of the CTA graphical element 508, the CTA graphical element 508 comprises a camera icon to communicate that user selection of the CTA graphical element 508 triggers a reply camera function of the interaction system 100. In some examples, a user-selectable icon 806 (here, a birthday icon) is shown in conjunction with the CTA graphical element 508 to identify the detected event type. In some examples, a selectable user interface element displayed is represented by the icon 806, and/or the CTA graphical element 508.

In some examples, the interaction client 104 receives the user selection of a selectable user interface element, such as icon 806, indicating that the first user wishes to send a message with a content augmentation to the second user. In response to the user selection, the interaction client 104 identifies one or more content augmentations relevant to the trigger criterion for the second user by accessing a mapping of content augmentations to the trigger criterion. For example, here a corresponding augmentation graphical feature 810, such as birthday celebration graphics and background image, is applied to the user content item 608 to generate a composite image that can be conveniently sent to a user system 102 of the second user identified by the identification information 502. In some examples, the augmentation graphical feature 810 is applied to the user content item 608 within the reply camera user interface 804.

In some examples, the interaction client 104 receives the user selection of a selectable user interface element represented by the CTA graphical element 508. Upon detecting the user selection of CTA graphical element 508, the reply camera user interface 804 is presented by the interaction system 100. A user content item 608 is displayed within the reply camera user interface 804, as a captured image by the first user. The reply camera user interface 804 also includes a lens carousel 610, within which a lens button 812 is preselected. As a result, the corresponding augmentation graphical feature 810 (e.g., birthday celebration graphics and background image) is applied to the user content item 608 to generate a composite image that can be conveniently sent to the second user identified by the identification information 502. If so wished, the user may select a different augmentation function, corresponding to a different augmentation graphical feature, from the lens carousel (for example, discarding the birthday event-related suggestion for a different option).

In some examples, a selected content augmentation (such as a specific lens) is applied to a real-time video feed of a camera system. The interaction client initiates opening of the camera system to capture the real-time video feed and displays it on a user interface of the interaction client 104 (e.g., as user content item 608). In some examples, augmentation 810 corresponds to a selected content augmentation (e.g., lens 812) applied to a real-time video feed of (e.g., content captured by) a camera system.

Figure 9:
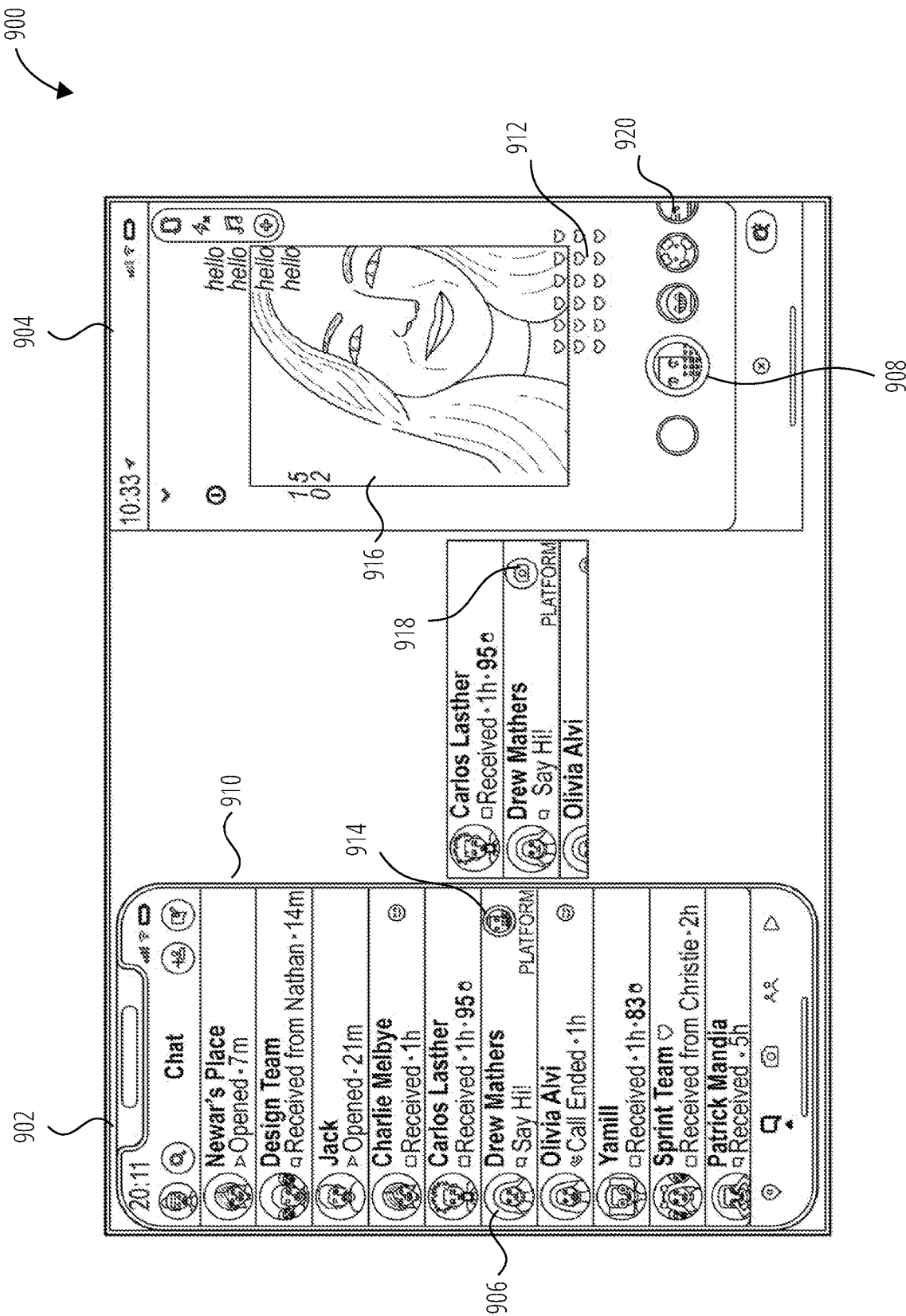
FIG. 9 is a user interface diagram, according to some examples.

FIG. 9 is a user interface diagram 900 showing a friend feed user interface 902 and a reply camera user interface 904, according to some examples of the chat interface 504 and the camera user interface 602, respectively.

The friend feed user interface 902 presents a friend feed 910 that includes a listing of users associated with a first user (here, the association is via a "friendship" relationship). The friend feed 910 includes identification information 906 for a specific, second user for which a "new friend" event is detected by the interaction system 100. Responsive to this event detection, a CTA graphical element 914 is presented within the friend feed user interface 902. The CTA graphical element 914 identifies a particular augmentation in the form of a lens. In a different representation of the CTA graphical element, the CTA graphical element comprises a camera icon 918 to primarily communicate that user selection of the CTA graphical element (in this case, via selecting camera icon 918) triggers a reply camera function of the interaction system 100.

Responsive to the user selection of the CTA graphical element 914, the reply camera user interface 904 presented by the interaction system 100. A user content item 916 is a captured image that is taken by a first user via a camera of a user system 102. The reply camera user interface 904 also includes a lens carousel 920, within which a lens button 908 is preselected, and a corresponding augmentation 912 is applied to the user content item 916 to generate a composite image that can be conveniently sent to the second user identified by the identification information 906, using the reply camera user interface 904.

In some examples, content augmentation 912 is applied to a real-time video feed of captured by a camera system. The interaction client initiates opening of the camera system to capture the real-time video feed (as user content item 916) and displays it on a user interface of the interaction client 104. Augmentation 912 corresponds to a selected content augmentation applied to a real-time video feed of (e.g., content captured by) a camera system, according to some examples.

Figure 10:
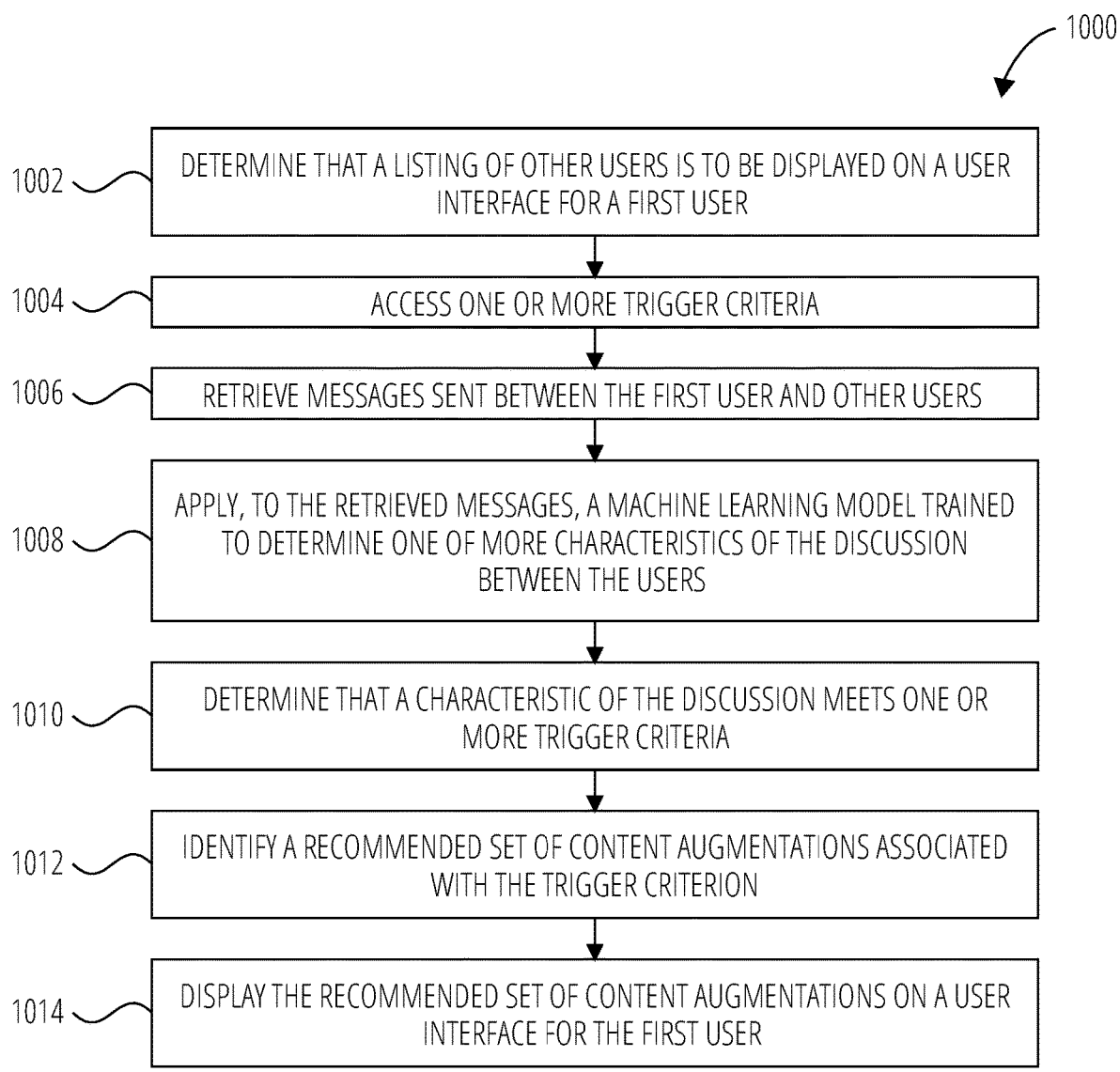
FIG. 10 is a flowchart illustrating a method for recommending content augmentations, according to some examples.

FIG. 10 is a flowchart illustrating a method 1000 for recommending content augmentations based on contextual information from messages exchanged between users, according to some examples.

At operation 1002, the interaction system 100 determines that a listing of other users associated with a first is to be displayed on a user interface of a user system 102 for the first user, such as a list of historical chat messages with other users. At operation 1004, the interaction system 100 accesses one or more trigger criteria. Details about identifying associated users can be found at least in the description of FIG. 4.

The interaction system 100 retrieves messages sent between the first user and other users at operation 1006 and applies, to the retrieved messages, a machine learning model trained to determine one or more characteristics of a discussion between the users, at operation 1008. For example, the interaction system 100 inputs all or a subset of the messages sent between the first user and the other users in the chat into the machine learning model. In another example, the interaction system 100 inputs a subset of messages based on a number of messages, a certain time period when the messages were sent, a certain keyword or phrase used, messages sent by the sender or recipient, hashtags used, and/or the like.

The interaction system 100 receives contextual information from the machine learning model. For example, if a user is recommending certain restaurants to go to with a second user on a trip to California, the machine learning module outputs "restaurants" as the topic of discussion. In some examples, the machine learning model outputs more than one output, such as "restaurants," "travel," and "California." Multiple outputs are used to determine a more relevant trigger criterion. In some examples, multiple outputs are used to identify more than one relevant trigger criteria.

The interaction system 100 determines that a characteristic of the discussion meets a trigger criterion of the one or more trigger criteria at operation 1010 and identifies a recommended set of content augmentations associated with the trigger criterion at operation 1012. For example, the interaction system 100 determines that the "restaurants" context matches a trigger criterion for food and identifies content augmentations that augment a camera feed with digital items related to certain types of food. The interaction system 100 causes display of the recommended set of content augmentations on a user interface of a user system 102 for the first user, at operation 1014.

In some examples, the machine learning model is stored and applied on the interaction client 104 whereas the machine learning model is trained by the interaction servers 124. In other examples, the machine learning model is applied and/or trained in other systems of the interaction system.

Figure 11:
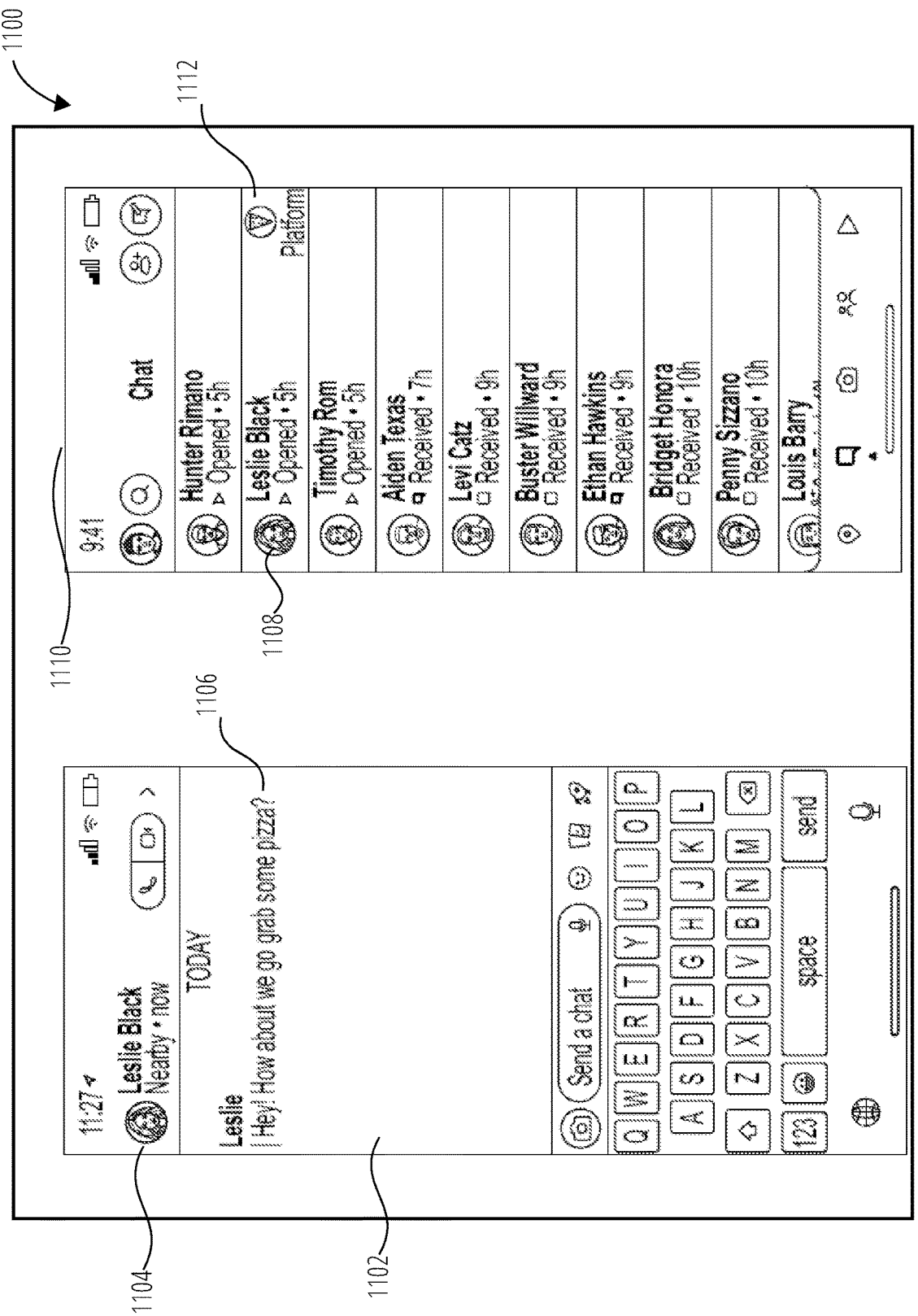
FIG. 11 is a user interface diagram, according to some examples.

FIG. 11 illustrates a user interface diagram 1100 showing a chat window 1102 between a first user and a second user, as well as a listing of other users 1110 and an icon 1112 representing recommended content augmentations relevant to a characteristic of the conversation between the two users.

The first user and the second user exchange messages within this chat window 1102. For example, the second user asks "Hey! How about we go grab some pizza?" in message 1106. The interaction client 104 of the first user assesses context of the discussion to determine whether recommended content augmentations should be presented. The interaction client 104 inputs text from the chat window to a machine learning model that is trained to identify characteristics in the text between the users, such as the topic of discussion. The machine learning model identifies that the topic of discussion between the user of the interaction client and the second user 1104 is pizza.

The interaction client 104 accesses trigger criteria to determine whether the characteristic of the discussion identified by the machine learning model meets a trigger criterion. The interaction client 104 identifies that the topic of discussion meets a particular trigger criterion (e.g., the pizza trigger criterion). The interaction client 104 adds a selectable user interface element (here, a pizza icon) 1112 adjacent to the second user 1108 based on applying the trigger criterion to the output of the machine learning model.

In response to a user selection of the user interface element, the interaction client 104 opens the camera system while applying a first content augmentation, where the first user has the option to scroll through the other content augmentations in the set of recommended content augmentations, capture a video or picture of the real-time video feed modified with the digital items, and send to the second user the video or picture relevant to a characteristic (such as a topic of discussion) between the two users.

Data Communications Architecture

Figure 12:
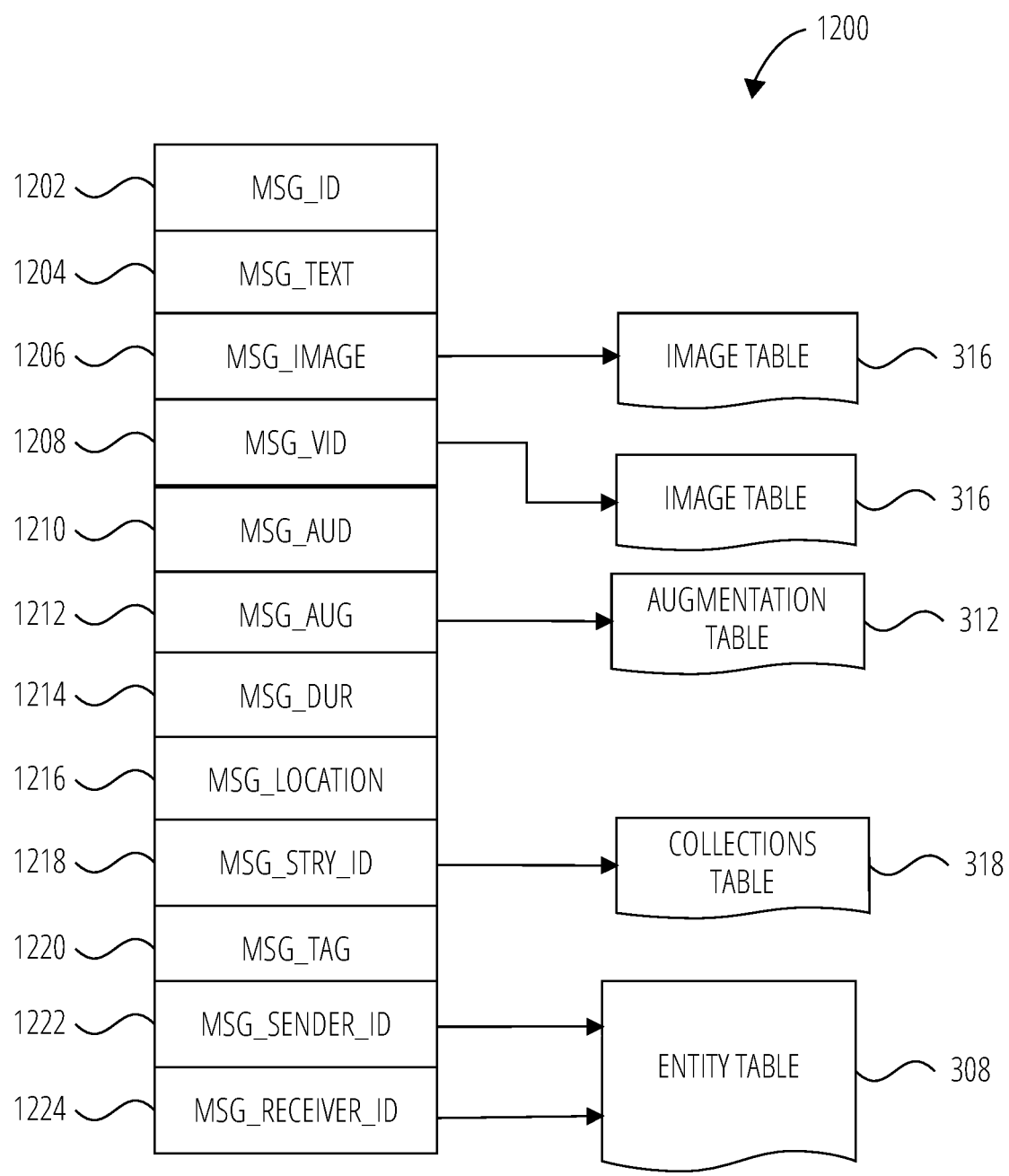
FIG. 12 is a diagrammatic representation of a message, according to some examples.

FIG. 12 is a schematic diagram illustrating a structure of a message 1200, according to some examples, generated by an interaction client 104 for communication to a further interaction client 104 via the interaction servers 124. The content of a particular message 1200 is used to populate the message table 306 stored within the database 304, accessible by the interaction servers 124. Similarly, the content of a message 1200 is stored in memory as "in-transit" or "in-flight" data of the user system 102 or the interaction servers 124. A message 1200 is shown to include the following example components:

- Message identifier 1202: a unique identifier that identifies the message 1200.
- Message text payload 1204: text, to be generated by a user via a user interface of the user system 102, and that is included in the message 1200.
- Message image payload 1206: image data, captured by a camera component of a user system 102 or retrieved from a memory component of a user system 102, and that is included in the message 1200. Image data for a sent or received message 1200 may be stored in the image table 316.
- Message video payload 1208: video data, captured by a camera component or retrieved from a memory component of the user system 102, and that is included in the message 1200. Video data for a sent or received message 1200 may be stored in the image table 316.
- Message audio payload 1210: audio data, captured by a microphone or retrieved from a memory component of the user system 102, and that is included in the message 1200.
- Message augmentation data 1212: augmentation data (e.g., filters, stickers, or other annotations or enhancements) that represents augmentations to be applied to message image payload 1206, message video payload 1208, or message audio payload 1210 of the message 1200. Augmentation data for a sent or received message 1200 may be stored in the augmentation table 312.
- Message duration parameter 1214: parameter value indicating, in seconds, the amount of time for which content of the message (e.g., the message image payload 1206, message video payload 1208, message audio payload 1210) is to be presented or made accessible to a user via the interaction client 104.
- Message geolocation parameter 1216: geolocation data (e.g., latitudinal, and longitudinal coordinates) associated with the content payload of the message. Multiple message geolocation parameter 1216 values may be included in the payload, each of these parameter values being associated with respect to content items included in the content (e.g., a specific image within the message image payload 1206, or a specific video in the message video payload 1208).
- Message story identifier 1218: identifier values identifying one or more content collections (e.g., "stories" identified in the collections table 318) with which a particular content item in the message image payload 1206 of the message 1200 is associated. For example, multiple images within the message image payload 1206 may each be associated with multiple content collections using identifier values.
- Message tag 1220: each message 1200 may be tagged with multiple tags, each of which is indicative of the subject matter of content included in the message payload. For example, where a particular image included in the message image payload 1206 depicts an animal (e.g., a lion), a tag value may be included within the message tag 1220 that is indicative of the relevant animal. Tag values may be generated manually, based on user input, or may be automatically generated using, for example, image recognition.
- Message sender identifier 1222: an identifier (e.g., a messaging system identifier, email address, or device identifier) indicative of a user of the user system 102 on which the message 1200 was generated and from which the message 1200 was sent.
- Message receiver identifier 1224: an identifier (e.g., a messaging system identifier, email address, or device identifier) indicative of a user of the user system 102 to which the message 1200 is addressed.

The contents (e.g., values) of the various components of message 1200 may be pointers to locations in tables within which content data values are stored. For example, an image value in the message image payload 1206 may be a pointer to (or address of) a location within an image table 316. Similarly, values within the message video payload 1208 may point to data stored within an image table 316, values stored within the message augmentation data 1212 may point to data stored in an augmentation table 312, values stored within the message story identifier 1218 may point to data stored in a collections table 318, and values stored within the message sender identifier 1222 and the message receiver identifier 1224 may point to user records stored within an entity table 308.

System with Head-Wearable Apparatus

Figure 13:
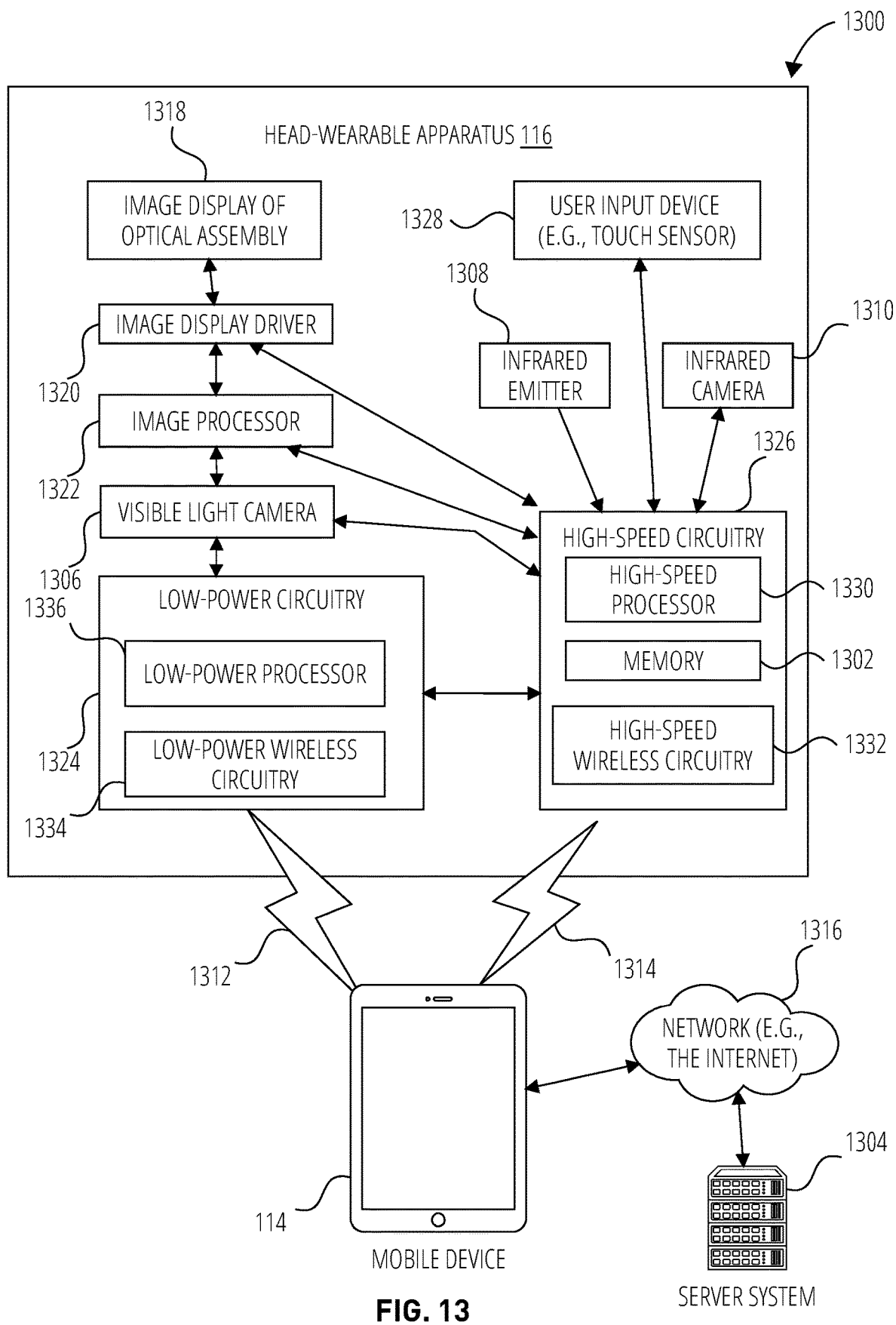
FIG. 13 illustrates a system in which the head-wearable apparatus, according to some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 108.

The head-wearable apparatus 116 includes one or more cameras, each of which may be, for example, a visible light camera 1306, an infrared emitter 1308, and an infrared camera 1310.

The mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of the image display of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a graphical user interface to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4

Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the graphical user interface of the presented image.

The components shown in FIG. 13 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 116. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WI-FI®. In some examples, other high-speed communications standards may be implemented by the high-speed wireless circuitry 1332.

The low-power wireless circuitry 1334 and the high-speed wireless circuitry 1332 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318. While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or the low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 116 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection 1312, or high-speed wireless connection 1314. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1312 and high-speed wireless connection 1314 from the mobile device 114 via the low-power wireless circuitry 1334 or high-speed wireless circuitry 1332.

Machine Architecture

Figure 14:
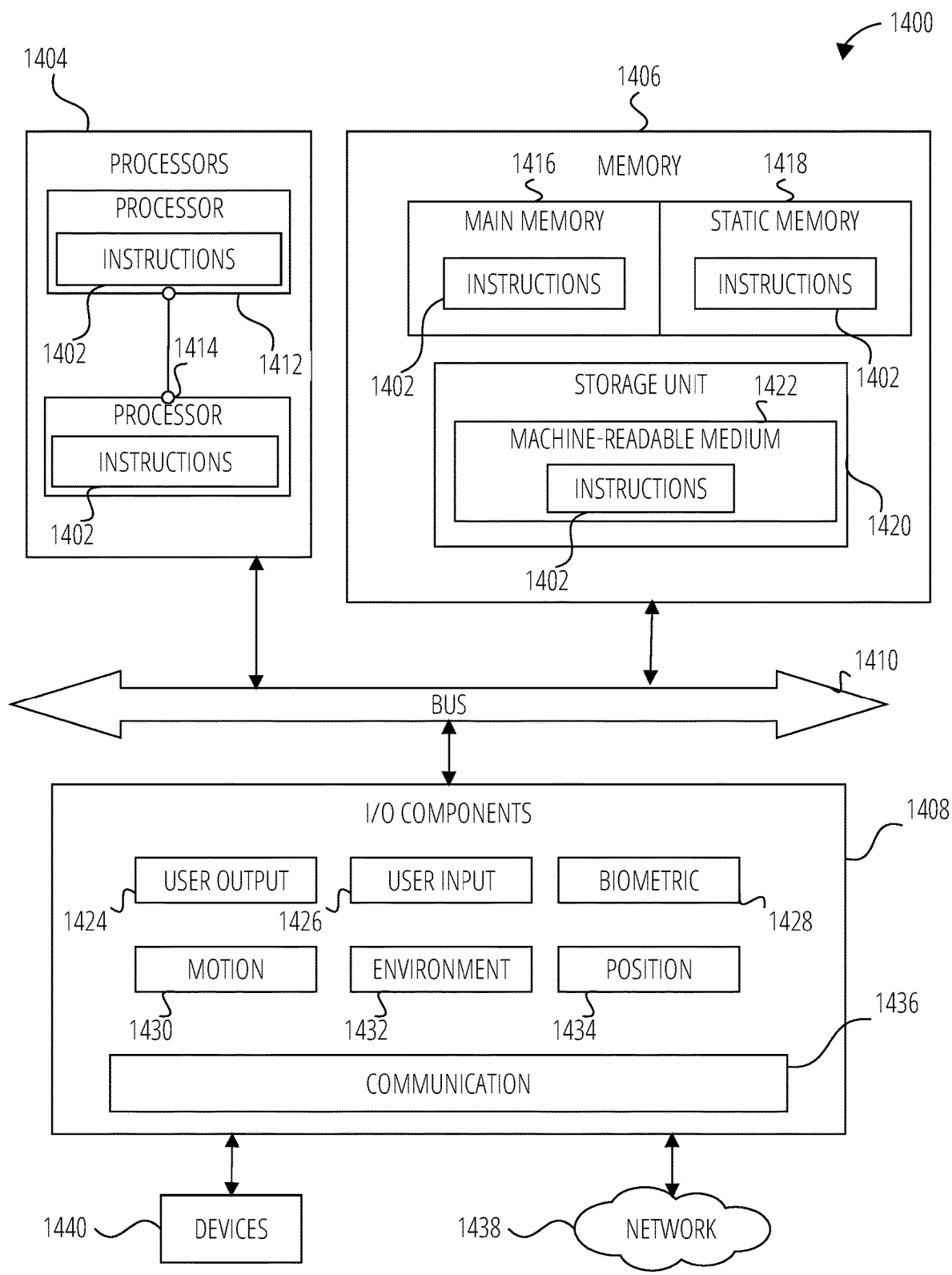
FIG. 14 is a diagrammatic representation of a machine in the form of a computer system within which a set of instructions may be executed to cause the machine to perform any one or more of the methodologies discussed herein, according to some examples.

FIG. 14 is a diagrammatic representation of the machine 1400 within which instructions 1402 (e.g., software, a program, an application, an applet, an app, or other executable code) for causing the machine 1400 to perform any one or more of the methodologies discussed herein may be executed. For example, the instructions 1402 may cause the machine 1400 to execute any one or more of the methods described herein. The instructions 1402 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1402, sequentially or otherwise, that specify actions to be taken by the machine 1400. Further, while a single machine 1400 is illustrated, the term "machine" shall also be taken to include a collection of machines that individually or jointly execute the instructions 1402 to perform any one or more of the methodologies discussed herein. The machine 1400, for example, may comprise the user system 102 or any one of multiple server devices forming part of the interaction server system 110. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1408, which may be configured to communicate with each other via a bus 1410. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that execute the instructions 1402. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1416, a static memory 1418, and a storage unit 1420, both accessible to the processors 1404 via the bus 1410. The main memory 1406, the static memory 1418, and storage unit 1420 store the instructions 1402 embodying any one or more of the methodologies or functions described herein. The instructions 1402 may also reside, completely or partially, within the main memory 1416, within the static memory 1418, within machine-readable medium 1422 within the storage unit 1420, within at least one of the processors 1404 (e.g., within the processor's cache memory), or any suitable combination thereof, during execution thereof by the machine 1400.

The I/O components 1408 may include a wide variety of components to receive input, provide output, produce output, transmit information, exchange information, capture measurements, and so on. The specific I/O components 1408 that are included in a particular machine will depend on the type of machine. For example, portable machines such as mobile phones may include a touch input device or other such input mechanisms, while a headless server machine will likely not include such a touch input device. It will be appreciated that the I/O components 1408 may include many other components that are not shown in FIG. 14. In various examples, the I/O components 1408 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1408 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1408 further include communication components 1436 operable to couple the machine 1400 to a network 1438 or devices 1440 via respective coupling or connections. For example, the communication components 1436 may include a network interface component or another suitable device to interface with the network 1438. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1440 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1416, static memory 1418, and memory of the processors 1404) and storage unit 1420 may store one or more sets of instructions and data structures (e.g., software) embodying or used by any one or more of the methodologies or functions described herein. These instructions (e.g., the instructions 1402), when executed by processors 1404, cause various operations to implement the disclosed examples.

The instructions 1402 may be transmitted or received over the network 1438, using a transmission medium, via a network interface device (e.g., a network interface component included in the communication components 1436) and using any one of several well-known transfer protocols (e.g., hypertext transfer protocol (HTTP)). Similarly, the instructions 1402 may be transmitted or received using a transmission medium via a coupling (e.g., a peer-to-peer coupling) to the devices 1440.

Software Architecture

Figure 15:
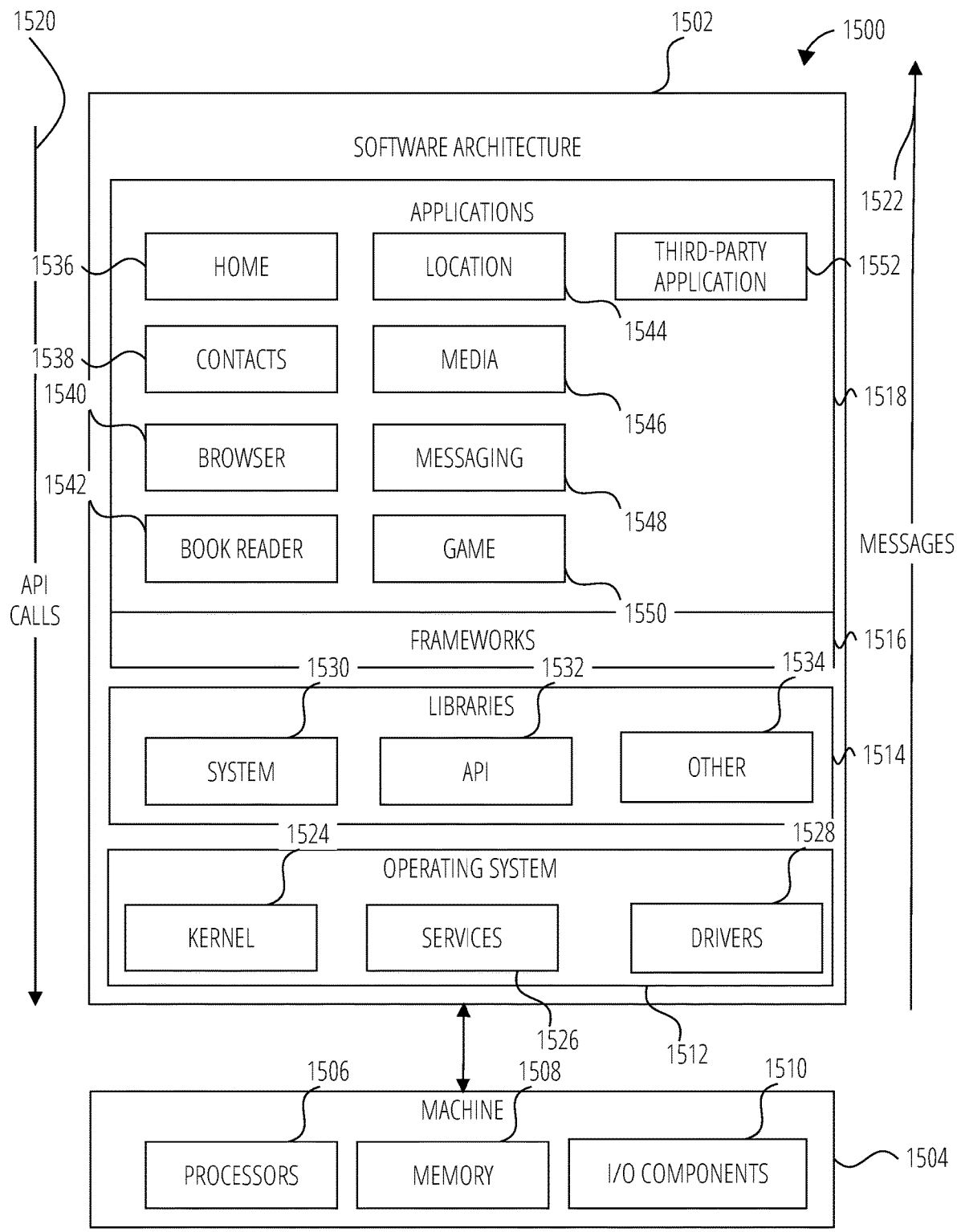
FIG. 15 is a block diagram showing a software architecture within which examples may be implemented.

FIG. 15 is a block diagram 1500 illustrating a software architecture 1502, which can be installed on any one or more of the devices described herein. The software architecture 1502 is supported by hardware such as a machine 1504 that includes processors 1506, memory 1508, and I/O components 1510. In this example, the software architecture 1502 can be conceptualized as a stack of layers, where each layer provides a particular functionality. The software architecture 1502 includes layers such as an operating system 1512, libraries 1514, frameworks 1516, and applications 1518. Operationally, the applications 1518 invoke API calls 1520 through the software stack and receive messages 1522 in response to the API calls 1520.

The operating system 1512 manages hardware resources and provides common services. The operating system 1512 includes, for example, a kernel 1524, services 1526, and drivers 1528. The kernel 1524 acts as an abstraction layer between the hardware and the other software layers. For example, the kernel 1524 provides memory management, processor management (e.g., scheduling), component management, networking, and security settings, among other functionalities. The services 1526 can provide other common services for the other software layers. The drivers 1528 are responsible for controlling or interfacing with the underlying hardware. For instance, the drivers 1528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1514 provide a common low-level infrastructure used by the applications 1518. The libraries 1514 can include system libraries 1530 (e.g., C standard library) that provide functions such as memory allocation functions, string manipulation functions, mathematic functions, and the like. In addition, the libraries 1514 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1514 can also include a wide variety of other libraries 1534 to provide many other APIs to the applications 1518.

The frameworks 1516 provide a common high-level infrastructure that is used by the applications 1518. For example, the frameworks 1516 provide various graphical user interface (GUI) functions, high-level resource management, and high-level location services. The frameworks 1516 can provide a broad spectrum of other APIs that can be used by the applications 1518, some of which may be specific to a particular operating system or platform.

In an example, the applications 1518 may include a home application 1536, a contacts application 1538, a browser application 1540, a book reader application 1542, a location application 1544, a media application 1546, a messaging application 1548, a game application 1550, and a broad assortment of other applications such as a third-party application 1552. The applications 1518 are programs that execute functions defined in the programs. Various programming languages can be employed to create one or more of the applications 1518, structured in a variety of manners, such as object-oriented programming languages (e.g., Objective-C, Java, or C++) or procedural programming languages (e.g., C or assembly language). In a specific example, the third-party application 1552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1552 can invoke the API calls 1520 provided by the operating system 1512 to facilitate functionalities described herein.

Examples

Example 1 is a method using at least one processor, the method comprising: accessing relationship data related to a first user of an interaction system to identify a second user of the interaction system associated with the first user; causing presentation, within an interaction interface, of identification information for the second user of the interaction system; identifying an event pertaining to the second user of the interaction system; and responsive to identifying the event pertaining to the second user of the interaction system: causing presentation of a call-to-action graphical element in association with identification information of the second user within the interaction interface; detecting user selection of the call-to-action graphical element within the interaction interface; and responsive to detecting the user selection of the call-to-action graphical element, invoking an interaction function to facilitate an interaction between the first user and the second user, the interaction function comprising at least one of: a communication function to enable the first user to communicate digital content to the second user, using the interaction system, and an augmentation function to enable the first user to augment the digital content using an augmentation graphical feature.

In Example 2, the subject matter of Example 1 includes, wherein the augmentation graphical feature corresponds to an event type of the event pertaining to the second user.

In Example 3, the subject matter of Example 2 includes, wherein the event type of the event pertaining to the second user is a birthday event type, and the augmentation graphical feature is a birthday celebration graphical element.

In Example 4, the subject matter of Examples 1-3 includes, wherein: the second user is one of a set of users of the interaction system, each user in the set of users of the interaction system being associated with the first user based on at least one of a recorded bidirectional relationship or a recorded unidirectional relationship; and the method further comprises causing presentation of identification information for each user of the set of users of the interaction system, the presentation of the identification information being within the interaction interface.

In Example 5, the subject matter of Examples 1-4 includes, wherein the identification information for the second user comprises a user name and an avatar.

In Example 6, the subject matter of Examples 1-5 includes, wherein the event pertaining to the second user comprises creation of a recorded relationship between the first user and the second user.

In Example 7, the subject matter of Examples 1-6 includes, wherein the identifying of an event pertaining to the second user comprises: applying one or more trigger criteria to user data of the second user; determining that the second user meets one of the one or more trigger criteria.

In Example 8, the subject matter of Example 7 includes, wherein the user data of the second user of the interaction system is at least one of user profile data or user message data.

In Example 9, the subject matter of Examples 7-8 includes, applying a machine learning model to the user data to determine or more characteristics of the user data, and wherein determining that the second user meets one of the one or more trigger criteria comprises determining that a characteristic of the user data for the second user meets one of the one or more trigger criteria.

In Example 10, the subject matter of Examples 1-9 includes, wherein the communication function is a reply camera function to enable the first user to capture at least one of a digital image or a digital video for communication to the second user, using the interaction system.

Example 11 is at least one machine-readable medium including instructions that, when executed by processing circuitry, cause the processing circuitry to perform operations to implement of any of Examples 1-10.

Example 12 is an apparatus comprising means to implement of any of Examples 1-10.

Example 13 is a system to implement of any of Examples 1-10.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled, or owned by a user and with which the user interacts perform an action or interaction on the user device, including an interaction with other users or computer systems.

"Extended Reality" or (XR) is an umbrella term encapsulating Augmented Reality (AR), Virtual Reality (VR), Mixed Reality (MR), and everything in between. For the sake of simplicity, examples herein are described using one type of system, such as XR or AR. However it is appreciated that other types of systems apply.

What is claimed is:

1. A method using at least one processor, the method comprising:
    accessing relationship data related to a first user of an interaction system to identify a second user of the interaction system associated with the first user;
    causing presentation, within an interaction interface, of identification information for the second user of the interaction system;
    identifying an event pertaining to the second user of the interaction system, the identifying of the event comprising:
        accessing a first set of events, each event of the first set of events being associated with event logic and a priority value;
        determining a second set of events corresponding to a subset of the first set of events, the event logic for each event in the second set of events matching user data of the second user; and
        selecting the event from the second set of events based on its associated priority value; and
    responsive to identifying the event pertaining to the second user of the interaction system:
    causing presentation of a call-to-action graphical element in association with identification information of the second user within the interaction interface;
    detecting user selection of the call-to-action graphical element within the interaction interface; and
    responsive to detecting the user selection of the call-to-action graphical element, invoking an interaction function to facilitate an interaction between the first user and the second user, the interaction function comprising at least one of:
    a communication function to enable the first user to communicate digital content to the second user, using the interaction system, and
    an augmentation function to enable the first user to augment the digital content using an augmentation graphical feature.

2. The method of claim 1, wherein the augmentation graphical feature corresponds to an event type of the event pertaining to the second user.

3. The method of claim 2, wherein the event type of the event pertaining to the second user is a birthday event type, and the augmentation graphical feature is a birthday celebration graphical element.

4. The method of claim 1, wherein:
    the second user is one of a set of users of the interaction system, each user in the set of users of the interaction system being associated with the first user based on at least one of a recorded bidirectional relationship or a recorded unidirectional relationship; and
    the method further comprises causing presentation of identification information for each user of the set of users of the interaction system, the presentation of the identification information being within the interaction interface.

5. The method of claim 1, wherein the identification information for the second user comprises a user name and an avatar.

6. The method of claim 1, wherein the event pertaining to the second user comprises creation of a recorded relationship between the first user and the second user.

7. The method of claim 1, wherein the user data of the second user of the interaction system is at least one of user profile data or user message data.

8. The method of claim 1, further comprising applying a machine learning model to the user data of the second user to determine one or more characteristics of the user data, and wherein determining the second set of events further comprises applying the event logic for each event in the first set of events to the one or more characteristics of the user data.

9. The method of claim 1, wherein the communication function is a reply camera function to enable the first user to capture at least one of a digital image or a digital video for communication to the second user, using the interaction system.

10. A computing apparatus comprising:
    at least one processor; and
    at least one memory storing instructions that, when executed by the at least one processor, configure the computing apparatus to perform operations comprising:
    accessing relationship data related to a first user of an interaction system to identify a second user of the interaction system associated with the first user;
    causing presentation, within an interaction interface, of identification information for the second user of the interaction system;
    identifying an event pertaining to the second user of the interaction system, the identifying of the event comprising:
        accessing a first set of events, each event of the first set of events being associated with event logic and a priority value;
        determining a second set of events corresponding to a subset of the first set of events, the event logic for each event in the second set of events matching user data of the second user; and
    selecting the event from the second set of events based on its associated priority value; and
    responsive to identifying the event pertaining to the second user of the interaction system:
    causing presentation of a call-to-action graphical element in association with identification information of the second user within the interaction interface;
    detecting user selection of the call-to-action graphical element within the interaction interface; and
    responsive to detecting the user selection of the call-to-action graphical element, invoking an interaction function to facilitate an interaction between the first user and the second user, the interaction function comprising at least one of:
    a communication function to enable the first user to communicate digital content to the second user, using the interaction system, and
    an augmentation function to enable the first user to augment the digital content using an augmentation graphical feature.

11. The computing apparatus of claim 10, wherein the augmentation graphical feature corresponds to an event type of the event pertaining to the second user.

12. The computing apparatus of claim 11, wherein the event type of the event pertaining to the second user is a birthday event type, and the augmentation graphical feature is a birthday celebration graphical element.

13. The computing apparatus of claim 10, wherein
the second user is one of a set of users of the interaction system, each user in the set of users of the interaction system being associated with the first user based on at least one of a recorded bidirectional relationship or a recorded unidirectional relationship; and
the operations further comprise causing presentation of identification information for each user of the set of users of the interaction system, the presentation of the identification information being within the interaction interface.

14. The computing apparatus of claim 10, wherein identification information for the second user comprises a user name and an avatar.

15. The computing apparatus of claim 10, wherein the event pertaining to the second user comprises creation of a recorded relationship between the first user and the second user.

16. The computing apparatus of claim 10, wherein the user data of the second user is at least one of user profile data or user message data.

17. The computing apparatus of claim 10, wherein the operations further comprise:
applying a machine learning model to the user data to determine one or more characteristics of the user data of the second user, and wherein determining the second set of events further comprises applying the event logic for each event in the first set of events to the one or more characteristics of the user data.

18. The computing apparatus of claim 10, wherein the communication function is a reply camera function to enable the first user to capture at least one of a digital image or a digital video for communication to the second user, using the interaction system.

19. A non-transitory computer-readable storage medium, the computer-readable storage medium including instructions that when executed by a computer, cause the computer to perform operations comprising:

accessing relationship data related to a first user of an interaction system to identify a second user of the interaction system associated with the first user;
causing presentation, within an interaction interface, of identification information for the second user of the interaction system;
identifying an event pertaining to the second user of the interaction system, the identifying of the event comprising:
accessing a first set of events, each event of the first set of events being associated with event logic and a priority value;
determining a second set of events corresponding to a subset of the first set of events, the event logic for each event in the second set of events matching user data of the second user; and
selecting the event from the second set of events based on its associated priority value; and
responsive to identifying the event pertaining to the second user of the interaction system:
causing presentation of a call-to-action graphical element in association with identification information of the second user within the interaction interface;
detecting user selection of the call-to-action graphical element within the interaction interface; and
responsive to detecting the user selection of the call-to-action graphical element,
invoking an interaction function to facilitate an interaction between the first user and the second user, the interaction function comprising at least one of:
a communication function to enable the first user to communicate digital content to the second user, using the interaction system, and
an augmentation function to enable the first user to augment the digital content using an augmentation graphical feature.

20. The method of claim 1, wherein selecting the event from the second set of events further comprises determining a maximum priority value of a set of priority values associated with the second set of events, and selecting the respective event of the second set of events associated with the maximum priority value.

* * * * *